US012614486B2

(12) United States Patent
Nishiyama et al.

(10) Patent No.: US 12,614,486 B2
(45) Date of Patent: Apr. 28, 2026

(54) INFORMATION PROCESSING APPARATUS AND CONTROL METHOD

(71) Applicant: Lenovo (Singapore) Pte. Ltd., Singapore (SG)

(72) Inventors: Masaru Nishiyama, Kanagawa (JP); Yoshinori Ito, Kanagawa (JP); Yuichi Sone, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 432 days.

(21) Appl. No.: 18/301,961

(22) Filed: Apr. 17, 2023

(65) Prior Publication Data

US 2023/0395006 A1 Dec. 7, 2023

(30) Foreign Application Priority Data

Jun. 7, 2022 (JP) ................................. 2022-092285

(51) Int. Cl.
*G09G 3/00* (2006.01)
*G06F 3/16* (2006.01)

(52) U.S. Cl.
CPC .............. *G09G 3/035* (2020.08); *G06F 3/16* (2013.01); *G09G 2320/028* (2013.01); *G09G 2340/0492* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2012/0088548 A1 | 4/2012 | Yun et al. | |
| 2015/0138070 A1* | 5/2015 | Iwatsu | G06F 3/017 |
| | | | 345/156 |
| 2016/0034597 A1 | 2/2016 | Graf et al. | |
| 2018/0039408 A1 | 2/2018 | Cheong et al. | |
| 2019/0212877 A1* | 7/2019 | Sipko | G06F 3/1446 |
| 2020/0233451 A1* | 7/2020 | Hong | G06F 1/1681 |
| 2020/0371734 A1* | 11/2020 | Kawano | G06F 3/0416 |
| 2020/0379516 A1 | 12/2020 | Park et al. | |

(Continued)

FOREIGN PATENT DOCUMENTS

| | | |
|---|---|---|
| CN | 112130742 A | 12/2020 |
| CN | 112860014 A | 5/2021 |

(Continued)

*Primary Examiner* — Yi Wang
(74) *Attorney, Agent, or Firm* — Osha Bergman Watanabe & Burton LLP

(57) ABSTRACT

An information processing apparatus includes a foldable display, a memory that temporarily stores display data, and a processor that performs control when the display data is displayed on the display. The processor performs a display mode switching process of switching display modes in a predetermined order in a toggle manner each time a user performs specific input, the display modes being determined according to a combination of screen region control for controlling to display a screen region of the display as one screen region or as screen regions and a display direction control for controlling a display orientation on the screen region of the display, and a display mode restricting process of restricting display modes that are switchable in the display mode switching process among the display modes according to a usage form of the display.

17 Claims, 15 Drawing Sheets

(56)         References Cited

U.S. PATENT DOCUMENTS

| | | | |
|---|---|---|---|
| 2021/0150953 A1 | 5/2021 | Lee et al. | |
| 2021/0247805 A1 | 8/2021 | Min et al. | |
| 2021/0389865 A1* | 12/2021 | Kim | G06F 3/0482 |
| 2022/0004271 A1 | 1/2022 | Wang | |

FOREIGN PATENT DOCUMENTS

| | | | |
|---|---|---|---|
| JP | 3876680 | B2 | 2/2007 |
| JP | 2012-508405 | A | 4/2012 |
| JP | 2013-545168 | A | 12/2013 |
| JP | 5653920 | B2 | 1/2015 |
| JP | 6000258 | B2 | 9/2016 |
| JP | 2017010226 | A | 1/2017 |
| JP | 2018-013850 | A | 1/2018 |
| JP | 2018182697 | A | 11/2018 |
| JP | 2019-67308 | A | 4/2019 |
| JP | 2019-91207 | A | 6/2019 |
| JP | 6567621 | B2 | 8/2019 |
| JP | 2020-518054 | A | 6/2020 |
| JP | 2020-190940 | A | 11/2020 |
| JP | 2021-009462 | A | 1/2021 |
| JP | 2021-089513 | A | 6/2021 |
| JP | 2022-74748 | A | 5/2022 |
| KR | 2017-0020069 | A | 2/2017 |
| KR | 2020-0124402 | A | 11/2020 |
| KR | 2021-0058573 | A | 5/2021 |

* cited by examiner

START

DETERMINE USAGE FORM — S101

DETERMINE DISPLAY MODE
SWITCHING SPECIFICATION — S103

S105

HAS DISPLAY
MODE SWITCHING TRIGGER
BEEN DETECTED?

NO

YES

SWITCH DISPLAY MODES
ACCORDING TO SWITCHING
SPECIFICATION — S107

TouchPad Gesture
e.g. 2 figure swipe

30

35

Touch gesture

INFORMATION PROCESSING APPARATUS AND CONTROL METHOD

CROSS-REFERENCE TO RELATED APPLICATIONS

This application claims priority to Japanese Patent Application No. 2022-92285 filed on Jun. 7, 2022, the contents of which are hereby incorporated herein by reference in their entirety.

BACKGROUND

Technical Field

The present invention relates to an information processing apparatus and a control method.

Description of Related Art

In recent years, an information processing apparatus in which a foldable flexible display (display unit) is provided over a first chassis and a second chassis to be bendable according to rotation between the first chassis and the second chassis is also disclosed (refer to, for example, Japanese Unexamined Patent Application Publication No. 2018-13850). In a case where one display is provided over the first chassis and the second chassis as described above, a plurality of display modes such as not only controlling to display a screen region of the display as one screen region but also controlling to display the screen region as a plurality of screen regions (for example, two screen regions) can be provided.

It is desired that the information processing apparatus having a plurality of display modes as described above can easily switch the display modes.

SUMMARY

The present invention has been made in view of the above circumstances, and an object of the present invention is to provide an information processing apparatus capable of easily switching a plurality of display modes, and a control method.

The present invention has been made to solve the above problems. According to a first aspect of the present invention, there is provided an information processing apparatus including a foldable display; a memory that temporarily stores display data to be displayed on the display; and a processor that performs control when the display data stored in the memory is displayed on the display, in which the processor performs a display mode switching process of switching a plurality of display modes in a predetermined order in a toggle manner each time a user performs specific input, the plurality of display modes being determined according to a combination of screen region control for controlling to display a screen region of the display as one screen region or as a plurality of screen regions and a display direction control for controlling a display orientation on the screen region of the display, and a display mode restricting process of restricting display modes that are switchable in the display mode switching process among the plurality of display modes according to a usage form of the display.

According to a second aspect of the present invention, there is provided an information processing apparatus including a foldable display; a memory that temporarily stores display data to be displayed on the display; and a processor that performs control when the display data stored in the memory is displayed on the display, in which the processor performs a display mode switching process of switching a plurality of display modes in a predetermined order in a toggle manner each time a user performs specific input, the plurality of display modes being determined according to a combination of screen region control for controlling to display a screen region of the display as one screen region or as a plurality of screen regions and a display direction control for controlling a display orientation on the screen region of the display, and a display mode order change process of changing the predetermined order when the plurality of display modes are switched in the display mode switching process according to a usage form of the display.

In the information processing apparatus, the plurality of display modes may be determined according to, in addition to the screen region control and the display direction control, which screen region is set as a primary screen when the screen region is controlled to be displayed as the plurality of screen regions.

In the information processing apparatus, the usage form of the display may be based on at least one or both of whether or not the display is in a bent state and an orientation of the display.

In the information processing apparatus, the processor may further perform a history storage process of storing a history of a display mode selected by the user for each usage form of the display, and in the display mode restricting process, among the plurality of display modes, may exclude a display mode selected infrequently by the user for each usage form of the display from the display modes that are switchable in the display mode switching process.

In the information processing apparatus, the processor may further perform a history storage process of storing a history of a display mode selected by the user for each usage form of the display, and in the display mode order change process, may set the predetermined order when the plurality of display modes are switched in the display mode switching process to an order in which a display mode selected frequently by the user for each usage form of the display among the plurality of display modes is prioritized.

In the information processing apparatus, the specific input may be operation input on a specific shortcut key of a keyboard connected to the information processing apparatus.

In the information processing apparatus, the processor may control to enable or disable the display mode switching process based on operation input on the keyboard according to the usage form of the display.

In the information processing apparatus, the processor may enable the display mode switching process based on the operation input on the keyboard in a case where the display is in a bent state, and disable the display mode switching process based on the operation input on the keyboard in a case where the display is not in the bent state.

In the information processing apparatus, the specific input may be specific operation input on a touch pad included in a keyboard connected to the information processing apparatus.

In the information processing apparatus, the specific operation input may be a specific touch operation on the display.

In the information processing apparatus, the processor may control to enable or disable the display mode switching process based on operation input on the display according to the usage form of the display.

In the information processing apparatus, the processor may determine whether or not the information processing apparatus is in a state of being held by the user, and enable the display mode switching process based on operation input on the display in a case where it is determined that the information processing apparatus is in a state of being held by the user, and disable the display mode switching process based on the operation input on the display in a case where it is determined that the information processing apparatus is not in the state of being held by the user.

In the information processing apparatus, in a case where a connection with the keyboard is detected, the processor may disable the display mode switching process based on operation input on the display.

In the information processing apparatus, the specific operation input may be a specific gesture, and the processor may further perform a gesture image detection process of detecting a specific gesture image from a captured image that is captured by an imaging unit, and execute the display mode switching process each time the specific gesture image is detected in the gesture image detection process.

In the information processing apparatus, the specific input may be input of a specific voice, the information processing apparatus may further include a voice collecting unit that collects voices, and the processor may further perform a voice detection process of detecting the specific voice from the voices collected by the voice collecting unit that collects the voices, and execute the display mode switching process each time the specific voice is detected in the voice detection process.

According to a third aspect of the present invention, there is provided a control method in an information processing apparatus including a foldable display, a memory that temporarily stores display data to be displayed on the display, and a processor that performs control when the display data stored in the memory is displayed on the display, the control method including causing the processor to execute a step of switching a plurality of display modes in a predetermined order in a toggle manner each time a user performs specific input, the plurality of display modes being determined according to a combination of screen region control for controlling to display a screen region of the display as one screen region or as a plurality of screen regions and a display direction control for controlling a display orientation on the screen region of the display, and a step of restricting display modes that are switchable among the plurality of display modes according to a usage form of the display.

According to a fourth aspect of the present invention, there is provided a control method in an information processing apparatus including a foldable display, a memory that temporarily stores display data to be displayed on the display, and a processor that performs control when the display data stored in the memory is displayed on the display, the control method including causing the processor to execute a step of switching a plurality of display modes in a predetermined order in a toggle manner each time a user performs specific input, the plurality of display modes being determined according to a combination of screen region control for controlling to display a screen region of the display as one screen region or as a plurality of screen regions and a display direction control for controlling a display orientation on the screen region of the display, and a step of changing the predetermined order when the plurality of display modes are switched according to a usage form of the display.

According to the above aspects of the present invention, it is possible to easily switch a plurality of display modes.

DETAILED DESCRIPTION

Hereinafter, embodiments of the present invention will be described with reference to the drawings.

First Embodiment

First, a first embodiment will be described.

Figure 1:
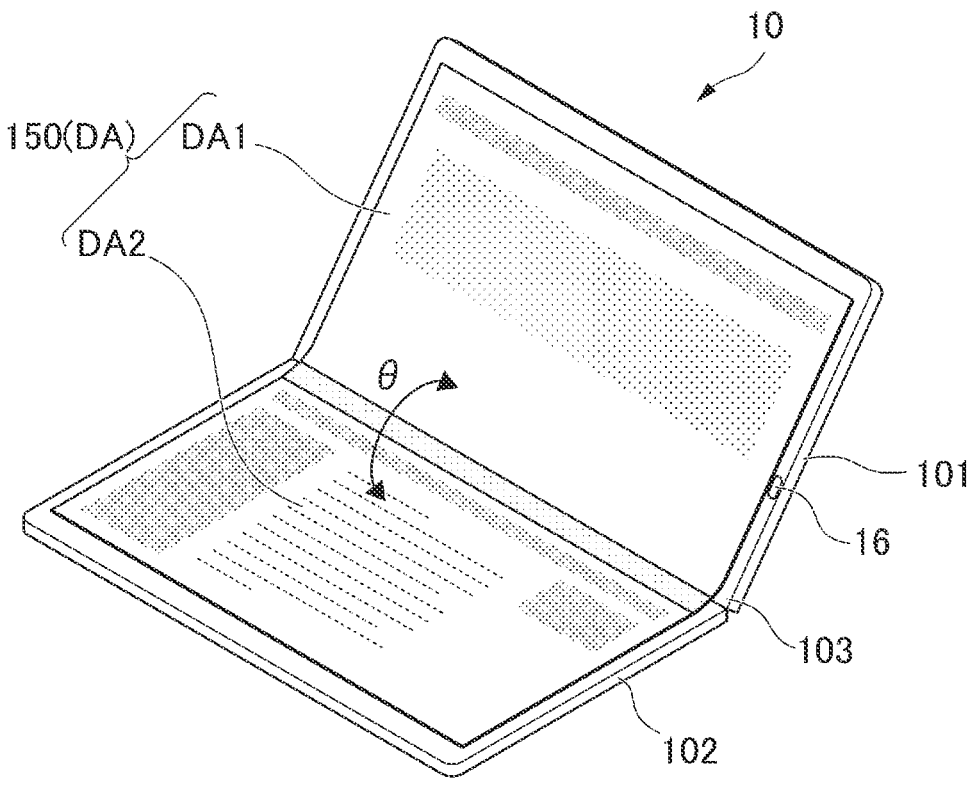
FIG. 1 is a perspective view illustrating an external appearance of an information processing apparatus according to a first embodiment.

FIG. 1 is a perspective view illustrating an external appearance of an information processing apparatus 10 according to the present embodiment. The information processing apparatus 10 according to the present embodiment is a clamshell type (laptop type) personal computer (PC). The information processing apparatus 10 includes a first chassis 101, a second chassis 102, and a hinge mechanism 103. The first chassis 101 and the second chassis 102 are substantially quadrangular plate-shaped (for example, flat plate-shaped) chassis. One of side surfaces of the first chassis 101 and one of side surfaces of the second chassis 102 are coupled (connected) via the hinge mechanism 103, and the first chassis 101 and the second chassis 102 are relatively rotatable around a rotation axis formed by the hinge mechanism 103. A state in which an opening angle θ around the rotation axis of the first chassis 101 and the second chassis 102 is approximately 0° is a state in which the first chassis 101 and the second chassis 102 overlap each other and are closed. A state in which the first chassis 101 and the second chassis 102 are closed will be referred to as a "closed state". In the closed state, surfaces of the first chassis 101 and the second chassis 102 facing each other will be referred to as "inner surfaces", and surfaces opposite to the inner surface will be referred to as "outer surfaces". The opening angle θ can also be said to be an angle formed by the inner surface of the first chassis 101 and the inner surface of the second chassis 102. A state in which the first chassis 101 and the second chassis 102 are opened relative to the closed state will be referred to as an "open state". The open state is a state in which the first chassis 101 and the second chassis 102 are relatively rotated until the opening angle θ becomes larger than a preset threshold value (for example, 10°).

The information processing apparatus 10 includes a camera 16 and a display 150. The camera 16 is provided on the inner surface of the first chassis 101. The display 150 is provided from the inner surface of the first chassis 101 to the inner surface of the second chassis 102. The camera 16 is provided in, for example, an outer portion of a screen region of the display 150 on the inner surface of the first chassis 101, and can image a user or the like present on the side facing the display 150. The display 150 is a flexible display that can be bent according to the opening angle θ due to relative rotation of the first chassis 101 and the second chassis 102 (refer to FIGS. 2 and 3). As the flexible display, an organic EL display or the like is used. The information processing apparatus 10 can not only control to display the entire screen region of the display 150 as one screen region DA, that is, as one screen configuration but also control to display the entire screen region of the display 150 as two divided screen regions such as a first screen region DA1 and a second screen region DA2, that is, as a two-screen configuration. Here, the first screen region DA1 and the second screen region DA2 are screen regions that do not overlap each other. Here, out of the screen regions of the display 150, the screen region corresponding to the inner surface side of the first chassis 101 is the first screen region DA1, and the screen region corresponding to the inner surface side of the second chassis 102 is the second screen region DA2. Hereinafter, a display mode in which the display is controlled as the one-screen configuration will be referred to as a "one-screen mode", and a display mode in which the display is controlled as the two-screen configuration will be referred to as a "two-screen mode".

A touch sensor is provided on the screen region of the display 150. The information processing apparatus 10 can detect a touch operation on the screen region of the display 150. By opening the information processing apparatus 10, a user can visually recognize display of the display 150 provided on the inner surface of each of the first chassis 101 and the second chassis 102, or can perform a touch operation on the display 150, and can thus use the information processing apparatus 10.

Next, a usage form and a screen mode of the information processing apparatus 10 will be described in detail. First, as a usage form of the information processing apparatus 10, there are a state (bent form) in which the first chassis 101 and the second chassis 102 are bent depending on the opening angle θ between the first chassis 101 and the second chassis 102, and a flat state (flat form) in which the first chassis 101 and the second chassis 102 are not bent. In the following description, a state (bent form) in which the first chassis 101 and the second chassis 102 are bent will be simply referred to as a "bent state (bent form)", and a flat state (flat form) in which the first chassis 101 and the second chassis 102 are not bent will be simply referred to as a "flat state (flat form)". In the bent state (bent form), the display 150 provided over the first chassis 101 and the second chassis 102 is also in a bent state. In the flat state (flat form), the display 150 is also in a flat state.

Figure 2:
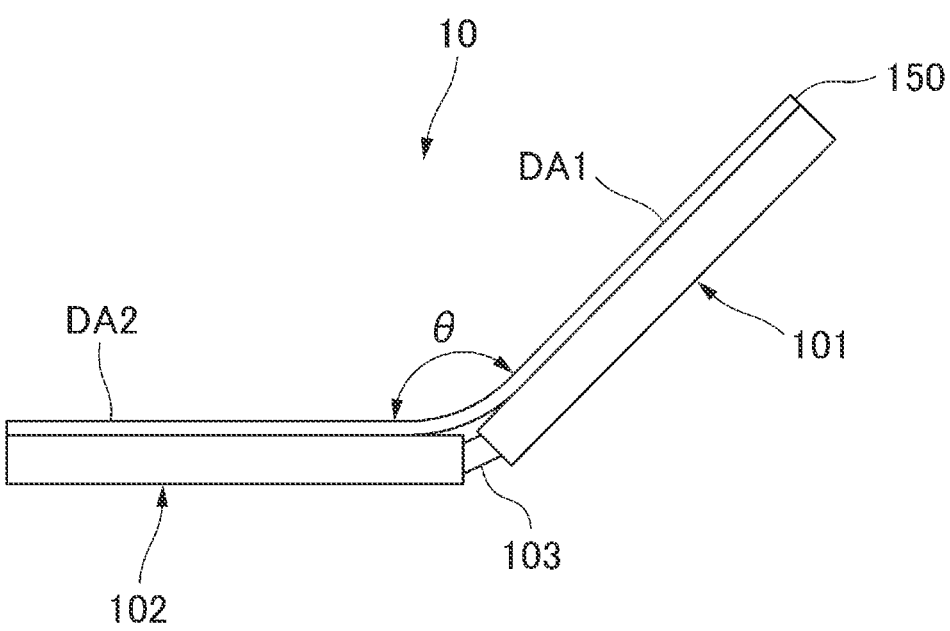
FIG. 2 is a side view illustrating an example of the information processing apparatus in a bent state according to the first embodiment.

FIG. 2 is a side view illustrating an example of the information processing apparatus 10 in the bent state (bent form). The display 150 is disposed over (across) the first chassis 101 and the second chassis 102. The screen region of the display 150 (the screen region DA illustrated in FIG. 1) can be bent with a portion corresponding to the hinge mechanism 103 as a crease, and the screen region on the first chassis 101 side is illustrated as the first screen region DA1 and the screen region on the second chassis 102 side is illustrated as the second screen region DA2 with the crease as a boundary. The display 150 is bent according to rotation (opening angle θ) between the first chassis 101 and the second chassis 102. It is determined whether or not the information processing apparatus 10 is in a bent state (bent form) according to the opening angle θ. As an example, in a case of 10°<θ<170°, it is determined that the information processing apparatus 10 is in a bent state (bent form). This state corresponds to a usage form such as a so-called clamshell mode or book mode.

Figure 3:
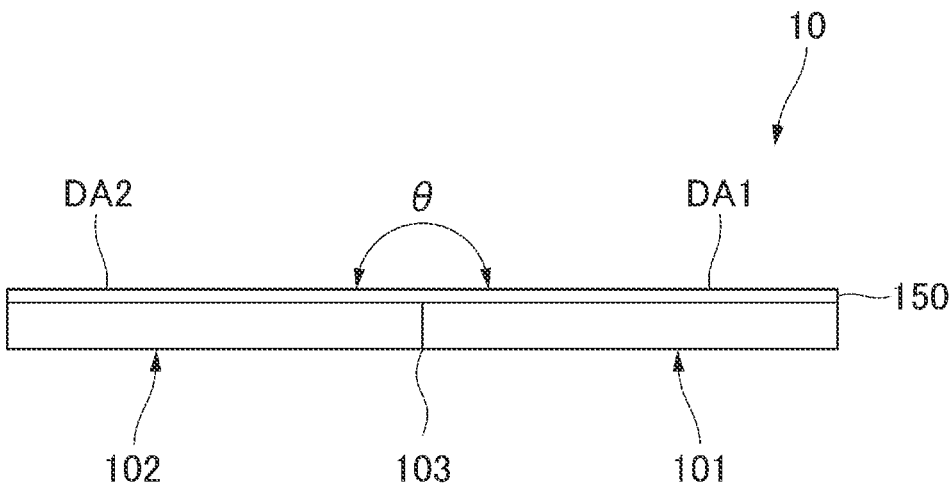
FIG. 3 is a side view illustrating an example of an information processing apparatus in a flat state according to a first embodiment.

FIG. 3 is a side view illustrating an example of the information processing apparatus 10 in a flat state (flat form). It is typically determined that the information processing apparatus 10 is in a flat state (flat form) in a case where the opening angle θ is 180°, but as an example, in a case of 170°≤θ≤180°, it may be determined that the information processing apparatus 10 is in a flat state (flat form). For example, in a case where the opening angle θ between the first chassis 101 and the second chassis 102 is 180°, the display 150 is also in a flat state. This state corresponds to a usage form called a so-called tablet mode.

Next, with reference to FIG. 4, display modes according to various usage forms of the information processing apparatus 10 will be described in detail.

Figure 4:
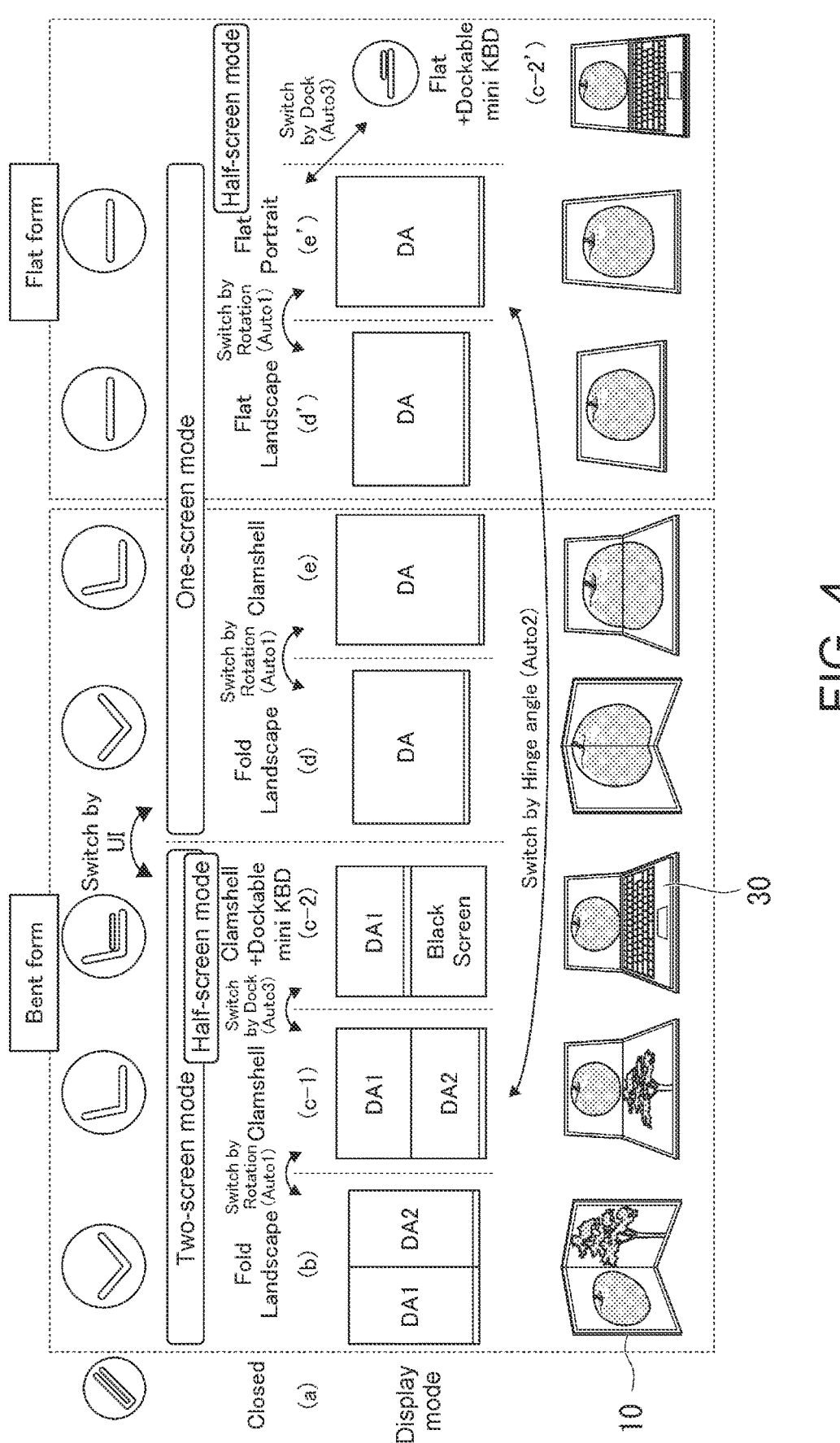
FIG. 4 is a diagram illustrating specific examples of various display modes of the information processing apparatus according to the first embodiment.

FIG. 4 is a diagram illustrating specific examples of various display modes of the information processing apparatus 10 according to the present embodiment. The information processing apparatus 10 has different display modes according to usage forms classified depending on the opening angle θ between the first chassis 101 and the second chassis 102, an attitude (orientation) of the information processing apparatus 10, whether a screen mode is a one-screen mode or a two-screen mode, and the like. One screen will also be referred to as a single screen, and two screens will also be referred to as split screens or dual screens.

The display mode (a) is a display mode when the first chassis 101 and the second chassis 102 are in a closed state (closed) as a usage form. For example, in this closed state, the information processing apparatus 10 is in a standby state such as a sleep state or a hibernation state (hibernation), and the display 150 is in a display-off state. The standby state such as the sleep state or the hibernation state (hibernation) corresponds to S3 or S4 of the power supply state of the system defined by, for example, Advanced Configuration and Power Interface (ACPI).

In the closed state, the information processing apparatus may be in a stopped state. The stopped state is a state in which the system is shut down and the power is turned off, and is, for example, a state corresponding to S5 defined by ACPI. The standby state and the stopped state are states in which some or all of processes performed by the system are restricted with respect to a normal operation state. The normal operation state is an operation state after the system has started and logged in, and is an operation state in which processes can be executed by the system without any particular restriction. The normal operation state corresponds to, for example, the S0 state defined by ACPI. Subsequently, a display mode when the first chassis 101 and the second chassis 102 are in an open state will be described.

The display mode (b) is a display mode when a usage form is a bent state (bent form), and a screen mode is a two-screen mode in which display control is performed such that the screen region of the display 150 is divided into two screen regions such as the first screen region DA1 and the second screen region DA2. The orientation of the information processing apparatus 10 is an orientation in which the first screen region DA1 and the second screen region DA2 are arranged horizontally side by side in a vertical orientation. The vertical orientation of the screen region means that the long side of the four sides of the rectangular screen region is in the vertical direction and the short side is in the horizontal direction. In a case where the screen region is in the vertical orientation, a display orientation is also a vertical orientation, and display is performed such that the direction along the long side corresponds to the vertical direction and the direction along the short side corresponds to the horizontal direction. This usage form is a usage form in which left and right pages when a book is opened correspond to the left and right screens, and corresponds to a so-called book mode. This usage form is also referred to as "fold landscape" because a screen region obtained by combining the first screen region DA1 and the second screen region DA2 side by side in a bent state (bent form) is horizontally long.

In this display mode (b), for example, in a normal operation state, the information processing apparatus 10 is in a two-screen display mode in which the first screen region DA1 on the left serves as a primary screen and the second screen region DA2 on the right serves as a secondary screen. In the display mode (b), a correspondence relationship between the first screen region DA1 and the second screen region DA2 and the primary screen and the secondary screen may be reversed.

Similar to the display mode (b), the display mode (c-1) is a display mode when a usage form is a bent state (bent form), and a screen mode is a two-screen mode in which display control is performed such that the screen region of the display 150 is divided into two screen regions such as the first screen region DA1 and the second screen region DA2, but an orientation of the information processing apparatus 10 is different. The orientation of the information processing apparatus 10 is an orientation in which the first screen region DA1 and the second screen region DA2 are arranged vertically side by side in a horizontal orientation. The horizontal orientation of the screen region means that the long side of the four sides of the rectangular screen region is in the horizontal direction and the short side is in the vertical direction. In a case where the screen region is in the horizontal orientation, a display orientation is also a horizontal orientation, and display is performed such that the direction along the long side corresponds to the horizontal direction and the direction along the short side corresponds to the vertical direction. This usage form is one of general usage forms of a clamshell type PC.

In this display mode (c-1), for example, in a normal operation state, the information processing apparatus 10 is in a two-screen display mode in which the first screen region DA1 serves as a primary screen and the second screen region DA2 serves as a secondary screen. In the display mode (c-1), a correspondence relationship between the first screen region DA1 and the second screen region DA2 and the primary screen and the secondary screen may be reversed.

For example, the information processing apparatus 10 detects a change in an attitude (orientation) of the information processing apparatus 10, and thus automatically switches from the display mode (b) to the display mode (c-1) or from the display mode (c-1) to the display mode (b) (Switch by Rotation). For example, since the display mode (c-1) is a state in which the display 150 is rotated 90 degrees rightward with respect to the display mode (b) as illustrated, when it is detected that the information processing apparatus 10 is rotated rightward from the display mode (b) by a predetermined angle (for example, 45 degrees) or more, the mode is switched to the display mode (c-1). Since the display mode (b) is a state in which the display 150 is rotated 90 degrees to leftward with respect to the display mode (c-1) as illustrated, when it is detected that the information processing apparatus 10 is rotated leftward from the display mode (c-1) by a predetermined angle (for example, 45 degrees) or more, the mode is switched to the display mode (d).

Similar to the display mode (c-1), the display mode (c-2) is a bent state (bent form) and a mode in which an orientation of the information processing apparatus 10 is the same, but is different therefrom in that an external keyboard 30 (dockable mini keyboard (KBD)) that can be connected to the information processing apparatus 10 is connected. This usage form is a state in which the physical keyboard 30 is connected in a general usage form of a clamshell type PC. For example, the keyboard 30 has almost the same size as that of the second screen region DA2 and is configured to be able to be placed on the second screen region DA2. As an example, the keyboard 30 is provided with a magnet inside (end portion) of a bottom surface thereof, and when placed on the second screen region DA2, the keyboard 30 is attracted and fixed to a metal portion of the inner surface end portion of the second chassis 102. As a result, the usage form is the same as that of a conventional clamshell type PC that is originally provided with a physical keyboard. The information processing apparatus 10 and the keyboard 30 are connected by, for example, Bluetooth (registered trademark). In this display mode (c-2), the information processing apparatus 10 controls the second screen region DA2 to be displayed black or turned off because the second screen region DA2 cannot be visually recognized due to the keyboard 30. That is, this display mode (c-2) is a display mode (hereinafter, referred to as a "half screen mode") in which only one screen region that is a half of the screen region of the display 150 is effective for display, and is a one-screen mode using only the first screen region DA1. That is, the half screen mode is a display mode in which display control is performed such that a partial screen region (first screen region DA1) excluding the screen region (second screen region DA2) on the side on which the keyboard 30 is placed from the screen region (screen region DA) of the display 150 is used as a screen region.

For example, when the information processing apparatus 10 detects a connection with an external keyboard in the state of the display mode (c-1), the information processing apparatus 10 automatically switches from the display mode (c-1) to the display mode (c-2) (Switch by Dock).

Similar to the display mode (b), the display mode (d) is a bent state (bent form), and a mode in which an orientation of the information processing apparatus 10 is the same, but is different therefrom because display control is performed to provide a one-screen mode in which the entire screen region of the display 150 is used as one screen region DA. This usage form is different from the display mode (b) in that a one-screen mode is provided, but will also be referred to as "fold landscape" because the display mode is a bent state (bent form) and the screen region DA is horizontally long. The screen region DA is in a horizontal orientation, and a display orientation is also a horizontal orientation.

Here, switching the one-screen mode and the two-screen mode in the bent state (bent form) is performed, for example, by a user operation. For example, the information processing apparatus 10 displays an operator as a user interface (UI) capable of switching the one-screen mode and the two-screen mode at any location on the screen, and switches from the display mode (b) to the display mode (d) on the basis of an operation on the operator (Switch by UI). Specific examples of this display mode switching operation will be described later.

Similar to the display mode (c-1), the display mode (e) is a bent state (bent form) and is a mode in which an orientation of the information processing apparatus 10 is the same, but is different therefrom because display control is performed to provide a one-screen mode in which the entire screen region of the display 150 is used as one screen region DA. This usage form is different from the display mode (c-1) in that a one-screen mode is provided, but corresponds to a usage form of a clamshell type PC from a bent state (bent form) and an orientation of the information processing apparatus 10. The screen region DA is in a vertical orientation, and a display orientation is also a vertical orientation.

For example, the information processing apparatus 10 detects a change in an attitude (orientation) of the information processing apparatus 10, and thus automatically changes from the display mode (d) to the display mode (e) or from the display mode (e) to the display mode (d) (Switch by Rotation). For example, since the display mode (e) is a state in which the display 150 is rotated 90 degrees rightward with respect to the display mode (d) as illustrated, when it is detected that the information processing apparatus

10 is rotated rightward from the state of the display mode (d) by a predetermined angle (for example, 45 degrees) or more, the mode is switched to the display mode (e). Since the display mode (d) is a state in which the display 150 is rotated 90 degrees rightward with respect to the display mode (e) as illustrated, when it is detected that the information processing apparatus 10 is rotated leftward from the state of the display mode (e) by a predetermined angle (for example, 45 degrees) or more, the mode is switched to the display mode (d).

Similar to the display mode (d), the display mode (d') is a one-screen mode, and is a mode in which an orientation of the information processing apparatus 10 is an orientation in which the screen region DA is horizontally long, but is different therefrom in that is a flat state (flat form) is provided. The flat state (flat form) is a state in which the opening angle θ between the first chassis 101 and the second chassis 102 is about 180°. This usage form corresponds to the so-called tablet mode described with reference to FIG. 3, and will also be referred to as "flat landscape" because a flat state (flat form) is provided and the screen region DA is horizontally long. This display mode (d') is different from the display mode (d) only in the opening angle θ between the first chassis 101 and the second chassis 102. Similar to the display mode (d), the screen region DA is in a horizontal orientation, and the display orientation is also in a horizontal orientation.

Similar to the display mode (e), the display mode (e') is a one-screen mode, and is a mode in which an orientation of the information processing apparatus 10 is also the orientation in which the screen region DA is vertically long, but is different therefrom in that a flat state (flat form) is provided. This usage form will also be referred to as "flat portrait" because a flat state (flat form) is provided and the screen region DA is vertically long. This display mode (e') is different from the display mode (e) only in the opening angle θ between the first chassis 101 and the second chassis 102. Similar to the display mode (e), the screen region DA is in a vertical orientation, and a display orientation is also a vertical orientation.

For example, the information processing apparatus 10 detects a change in an attitude (orientation) of the information processing apparatus 10, and thus automatically changes from the display mode (d') to the display mode (e') or from the display mode (e') to the display mode (d') (Switch by Rotation). For example, since the display mode (e') is a state in which the display 150 is rotated 90 degrees rightward with respect to the display mode (d') as illustrated, when it is detected that the information processing apparatus 10 is rotated rightward from the state of the display mode (d') by a predetermined angle (for example, 45 degrees) or more, the mode is switched to the display mode (e'). Since the display mode (d') is a state in which the display 150 is rotated 90 degrees rightward with respect to the display mode (e') as illustrated, when it is detected that the information processing apparatus 10 is rotated leftward from the state of the display mode (e') by a predetermined angle (for example, 45 degrees) or more, the mode is switched to the display mode (d').

In the display mode (d') and the display mode (e'), the user can operate the UI (operator) described above to switch to the two-screen mode while maintaining a flat state (flat form). For example, when the state of the display mode (d') is switched to the two-screen mode, a display state is the same as that in the display mode (b) in the flat state (flat form). When the state of the display mode (e') is switched to the two-screen mode, a display state is the same as that in the display mode (c-1) in the flat state (flat form).

When the information processing apparatus 10 detects a connection with the keyboard 30 in the state of the display mode (e'), the information processing apparatus 10 automatically switches from the display mode (e') to the display mode (c-2') (Switch by Dock). The display mode (c-2') is a flat state (flat form), and is different from the display mode (c-2) only in the opening angle θ between the first chassis 101 and the second chassis 102. In this display mode (c-2'), the information processing apparatus 10 controls the second screen region DA2 to be displayed black or turned off because the second screen region DA2 cannot be visually recognized due to the keyboard 30. That is, this display mode (c-2') is a half screen mode in which, as in the display mode (c-2), only one screen region that is a half of the screen region of the display 150 is effective for display.

In a case where the information processing apparatus 10 has detected a change from a flat state (flat form) to a bent state (bent form), the information processing apparatus 10 can be configured to switch from a one-screen mode to a two-screen mode. For example, in a case where a change to a bent state (bent form) in the state of the display mode (d') has been detected on the basis of the opening angle θ between the first chassis 101 and the second chassis 102, the information processing apparatus 10 automatically switches from the display mode (d') to the display mode (b). In a case where a change to a bent state (bent form) in the state of the display mode (e') has been detected on the basis of the opening angle θ between the first chassis 101 and the second chassis 102, the information processing apparatus 10 automatically switches from the display mode (e') to the display mode (c-1).

Usage forms in the display modes (b), (d), and (d') are all referred to as "landscape" because the screen region DA of the display 150 is horizontally long, whereas usage forms in the display modes (c-1), (e), and (e') are all referred to as "portrait" because the screen region DA of the display 150 is vertically long. A usage form of the information processing apparatus 10 is determined according to a screen mode (a one-screen mode or a two-screen mode) of the display 150, an orientation of the display 150 (landscape or portrait), and the like, and may thus be a usage form of the display 150.

(Display Mode Switching Operation)

Next, an operation specification when switching display modes according to operation input of a user will be described. As described above, in addition to switching display modes according to a change in usage form such as rotation in the horizontal direction or a change between a flat state and a bent state, the information processing apparatus 10 can also switch display modes in response to a user's operation.

For example, the information processing apparatus 10 displays, as a pop-up screen, a selection menu screen on which display mode options to be switched are displayed to be arranged, and switches to a display mode selected through a user's operation on the selection menu screen. The information processing apparatus 10 displays an operation icon for displaying the selection menu screen on a task bar. As a result, the user displays the selection menu screen by operating the operation icon displayed on the task bar, and then performs an operation of selecting a display mode desired to be switched from among the display mode options displayed on the selection menu screen, so that the display mode can be switched to a desired display mode.

However, the display mode switching method using the selection menu screen requires at least two operations. Depending on an OS, it may not be permitted to add an operation icon to the task bar as a specification of the OS. In that case, the operation icon for displaying the selection menu screen is moved to an overflow region to be displayed in a pop-up form by, for example, operating a predetermined icon on the task bar. Therefore, at least three operations are required to switch display modes. Since a plurality of icons are lined up in the overflow region, it may be difficult to find a desired icon. As described above, in the display mode switching method using a selection menu screen, an operation at the time of switching may be cumbersome and not easy.

Therefore, the information processing apparatus 10 according to the present embodiment employs a method of switching display modes in a toggle manner for each operation input, in addition to the method using the selection menu screen, as an operation specification when switching display modes through a user's operation input. As operation input that becomes a trigger when switching display modes in the toggle manner, for example, a shortcut key of a keyboard may be used as illustrated in FIG. 5.

Figure 5:
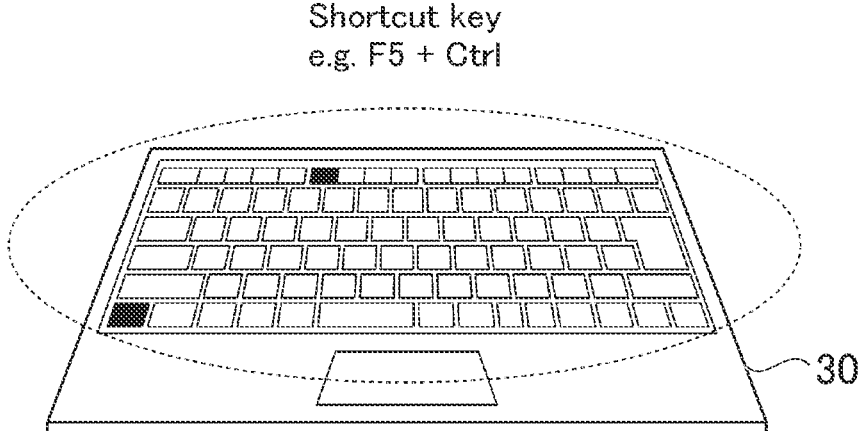
FIG. 5 is a diagram illustrating an example of a trigger for switching display modes according to the first embodiment.

FIG. 5 is a diagram illustrating an example of a trigger for switching display modes according to the present embodiment. As illustrated, a specific preset shortcut key (for example, F5+Ctrl) may be used as operation input that becomes a trigger when switching display modes in a toggle manner. For example, the information processing apparatus 10 switches display modes in a toggle manner each time an operation of a specific shortcut key (for example, F5+Ctrl) is input to the connected keyboard 30 by the user.

Any shortcut key used for switching display modes may be determined in consideration of other shortcut keys. In a case where another external keyboard is connected to the information processing apparatus 10 in addition to the keyboard 30, the information processing apparatus 10 can similarly switch display modes with a shortcut key by using the connected keyboard.

Figure 6:
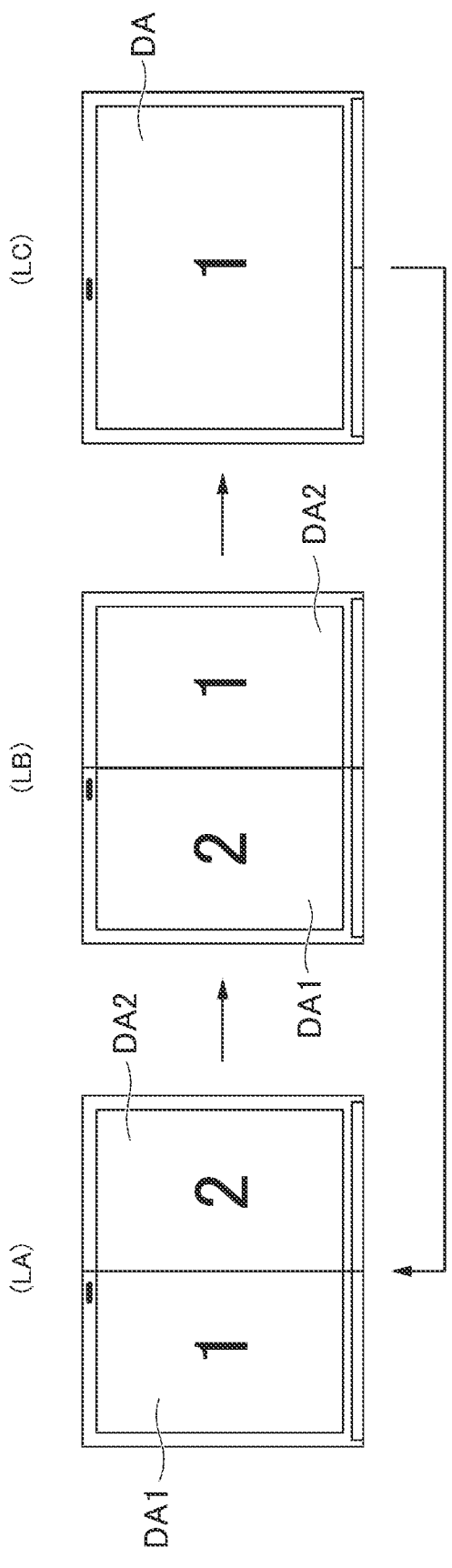
FIG. 6 is a diagram illustrating a first example of display modes switchable in a toggle manner according to the first embodiment and an order thereof.
Figure 7:
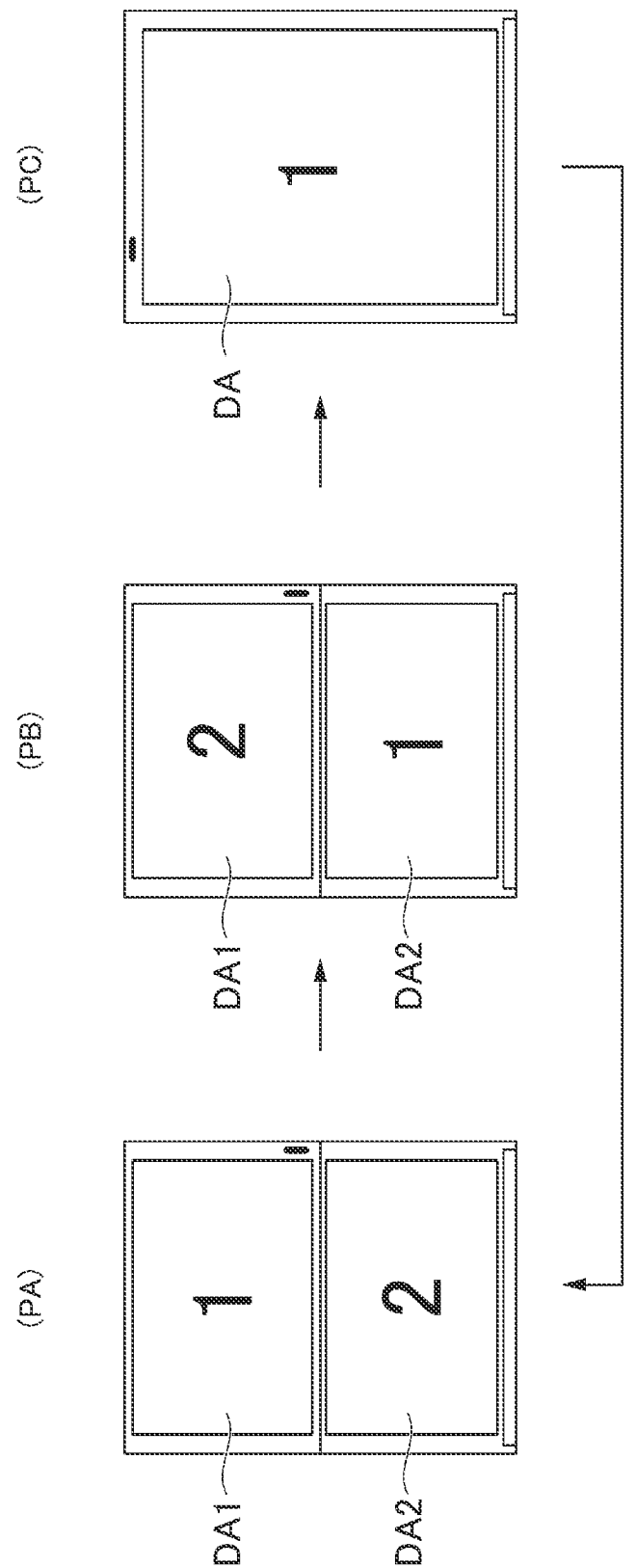
FIG. 7 is a diagram illustrating a second example of display modes switchable in a toggle manner according to the first embodiment and an order thereof.

In a case where display modes are switched in a toggle manner, the information processing apparatus 10 switches the display modes in a predetermined order each time the operation input on the shortcut key is performed, for example, as illustrated in FIGS. 6 and 7.

FIG. 6 is a diagram illustrating a first example of display modes switchable in a toggle manner according to the present embodiment and an order thereof. The example illustrated in FIG. 6 illustrates display modes that can be switched when a usage form is "landscape" and an order thereof. In the drawing, "1" in the two-screen mode indicates a primary screen, and "2" indicates a secondary screen. In a case where a usage form is "landscape", switchable display modes are restricted to display modes (the display mode (b), the display mode (d), and the display mode (d')) in a case where a usage form is "landscape".

(LA) is the display mode (b) corresponding to a two-screen mode, and is a display mode in which the first screen region DA1 is a primary screen and the second screen region DA2 is a secondary screen, and will be hereinafter referred to as a display mode LA. (LB) is the display mode (b) corresponding to the two-screen mode, and is a display mode in which the second screen region DA2 is the primary screen and the first screen region DA1 is the secondary screen, and will be hereinafter referred to as a display mode LB. (LC) is the display mode (d) or the display mode (d') corresponding to a one-screen mode, and will be hereinafter referred to as a display mode LC. In the illustrated example, the order of switching display modes in a toggle manner is an order of the display mode LA, the display mode LB, the display mode LC, the display mode LA, . . . (the same order thereafter).

FIG. 7 is a diagram illustrating a second example of display modes switchable in a toggle manner according to the present embodiment and an order thereof. The example illustrated in FIG. 7 shows display modes that can be switched when a usage form is "portrait" and the order thereof. In a case where a usage form is "portrait", switchable display modes are restricted to display modes (the display mode (c-1), the display mode (e), and the display mode (e')) in a case where a usage form is "portrait").

(PA) is the display mode (c-1) corresponding to a two-screen mode, and is a display mode in which the first screen region DA1 is a primary screen and the second screen region DA2 is a secondary screen, and will be hereinafter referred to as a display mode PA. (PB) is the display mode (c-1) corresponding to a two-screen mode, and is a display mode in which the second screen region DA2 is a primary screen and the first screen region DA1 is a secondary screen, and will be hereinafter referred to as a display mode PB. (PC) is the display mode (e) or the display mode (e') corresponding to a one-screen mode, and will be hereinafter referred to as a display mode PC. In the illustrated example, the order of switching display modes in a toggle manner is an order of the display mode PA, the display mode PB, the display mode PC, the display mode PA, . . . (the same order thereafter).

The information processing apparatus 10 may further restrict switchable display modes according to a usage form. For example, the information processing apparatus 10 may restrict a switchable display mode to only the two-screen mode in a case of a bent state (bent form).

Figures 8, 9, 10:
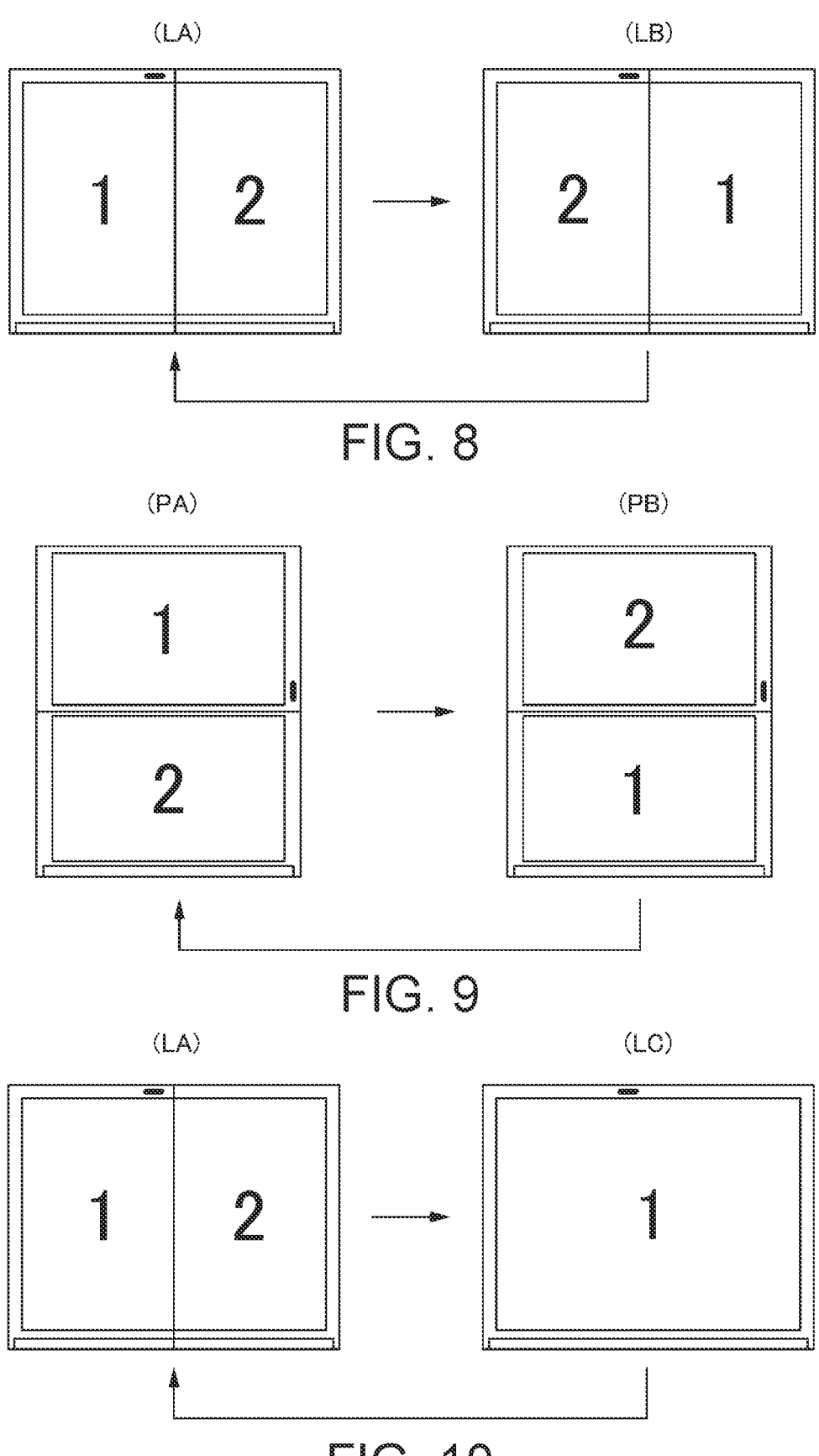
FIG. 8 is a diagram illustrating a third example of display modes switchable in a toggle manner according to the first embodiment and an order thereof.
FIG. 9 is a diagram illustrating a fourth example of display modes switchable in a toggle manner according to the first embodiment and an order thereof.
FIG. 10 is a diagram illustrating a fifth example of display modes switchable in a toggle manner according to the first embodiment and an order thereof.

FIG. 8 is a diagram illustrating a third example of display modes switchable in a toggle manner and the order thereof according to the present embodiment, and illustrates an example in a case of a bent state (bent form) and "landscape". In the illustrated example, the display mode LC corresponding to a one-screen mode is excluded from the switchable display modes with respect to the example illustrated in FIG. 6. The order in which the display modes are switched in a toggle manner is an order of the display mode LA, the display mode LB, the display mode LA, . . . (the same order thereafter).

FIG. 9 is a diagram illustrating a fourth example of display modes switchable in a toggle manner and an order thereof according to the present embodiment, and illustrates an example in a case of a bent state (bent form) and "portrait". In the illustrated example, the display mode PC corresponding to a one-screen mode is excluded from the switchable display modes with respect to the example illustrated in FIG. 7. The order in which the display modes are switched in a toggle manner is an order of the display mode PA, the display mode PB, the display mode PA, . . . (the same order thereafter).

The information processing apparatus 10 may restrict a switchable display mode by storing the history of a display mode selected by a user for each usage form and excluding a display mode infrequently selected by the user.

FIG. 10 is a diagram illustrating a fifth example of display modes switchable in a toggle manner according to the present embodiment and an order thereof. For example, in the information processing apparatus 10, in a case of "landscape" in a two-screen mode, in a case where the display mode LA is selected more frequently by the user and the display mode LB is selected less frequently, the display mode LB which is selected infrequently is excluded from the switchable display modes with respect to the example illustrated in FIG. 6. The order of switching display modes in a toggle manner is the display mode LA, the display mode LC, the display mode LA, . . . (the same order thereafter).

Although FIG. 10 illustrates an example of the case of "landscape", the same may be applied in the case of "portrait" in a two-screen mode. That is, in a case where the display mode PA is selected frequently by the user and the display mode PB is selected less frequently, the display mode PB which is selected infrequently may be excluded from the switchable display modes in the example illustrated in FIG. 7. That is, the order of switching display modes in a toggle manner may be an order of the display mode PA, the display mode PC, the display mode PA, . . . (the same order thereafter).

The information processing apparatus 10 may change the order in which display modes are switched in a toggle manner according to a usage form. For example, the information processing apparatus 10 may switch display modes in the order illustrated in FIGS. 6 and 7 in a bent state (bent form) such that display modes corresponding to a two-screen mode are prioritized order, and switch display modes such that display modes corresponding to a one-screen mode are prioritized in a flat state (flat form).

Figure 11:
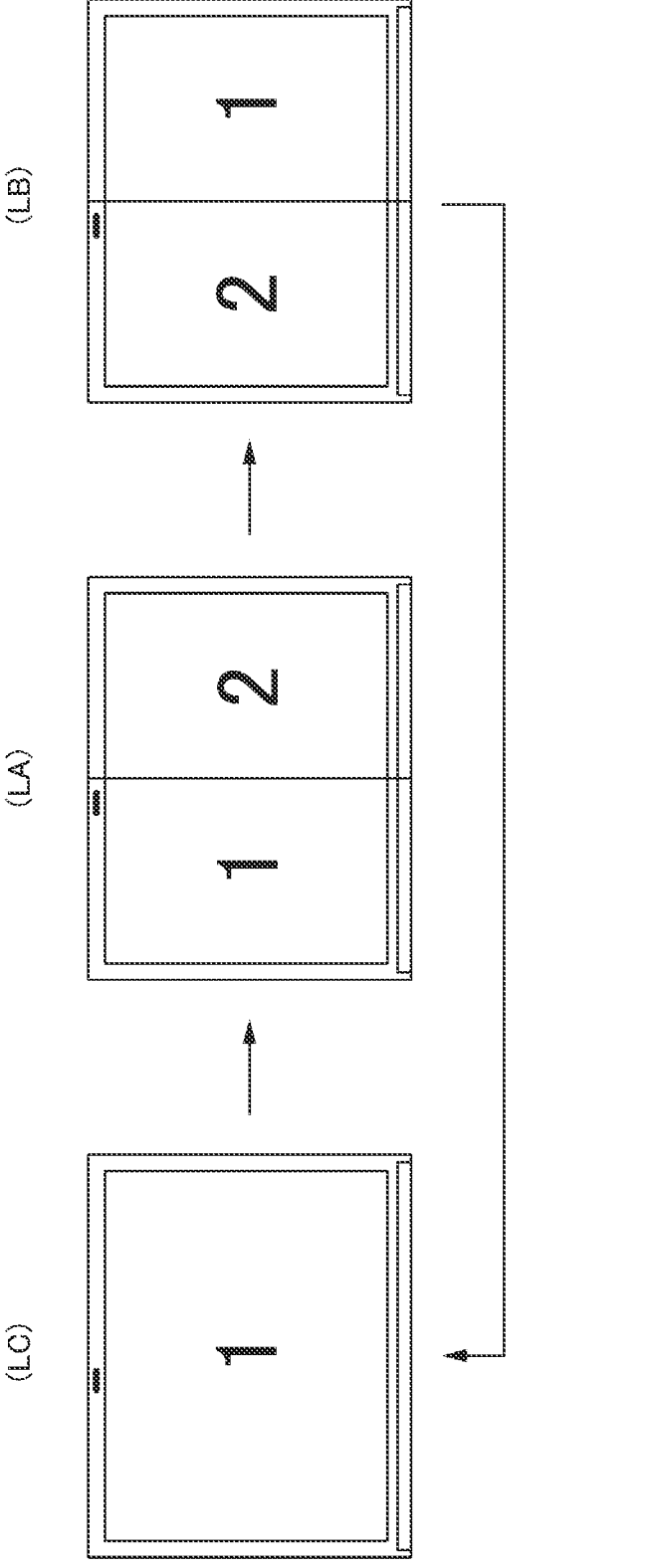
FIG. 11 is a diagram illustrating a sixth example of display modes switchable in a toggle manner according to the first embodiment and an order thereof.

FIG. 11 is a diagram illustrating a sixth example of display modes switchable in a toggle manner according to the present embodiment and an order thereof, and illustrates an example in a case of a flat state (flat form) and "landscape". The example illustrates an order in which the display mode LC corresponding to a one-screen mode is prioritized with respect to the example illustrated in FIG. 6. In the illustrated example, the order of switching display modes in a toggle manner is an order of the display mode LC, the display mode LA, the display mode LB, the display mode LC, . . . (the same order thereafter).

Similarly, in the case of a flat state (flat form) and "portrait", the display mode PC corresponding to a one-screen mode may be prioritized with respect to the example illustrated in FIG. 7, and the order of switching display modes in a toggle manner may be an order in which the display mode PC, the display mode PA, the display mode PB, the display mode PC, . . . (the same order thereafter).

The information processing apparatus 10 may store the history of display modes selected by the user for each usage form, and set the order of switching display modes in a toggle manner to an order in which a display mode frequently selected by the user is prioritized. In other words, the information processing apparatus 10 may set the order of switching display modes in a toggle manner to an order in which the priority of a display mode selected infrequently by the user is lowered.

Figure 12:
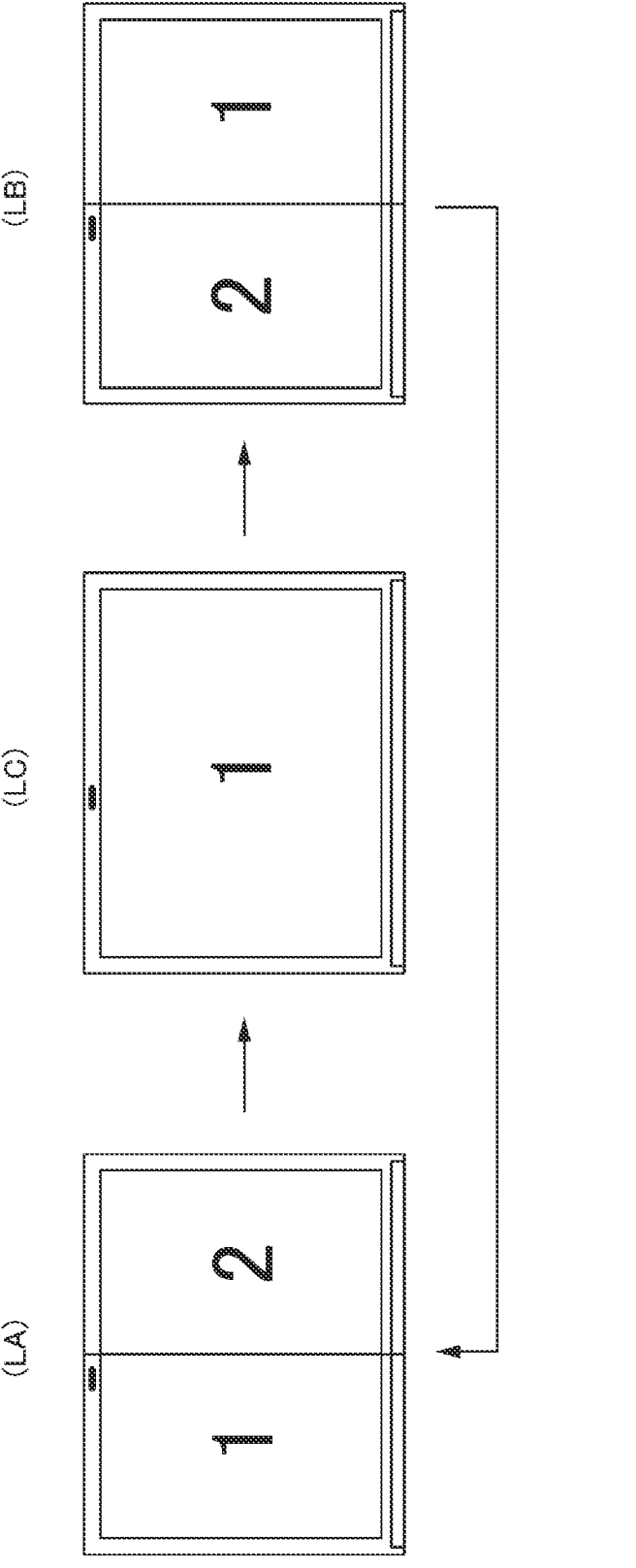
FIG. 12 is a diagram illustrating a seventh example of display modes switchable in a toggle manner according to the first embodiment and an order thereof.

FIG. 12 is a diagram illustrating a seventh example of display modes switchable in a toggle manner according to the present embodiment and an order thereof. For example, in the case of "landscape" in a two-screen mode, it is assumed that the display mode LA is selected more frequently by the user and the display mode LB is selected less frequently. In this case, the information processing apparatus 10 sets the order of switching display modes in a toggle manner to an order in which the display mode LA selected frequently by the user is prioritized and the priority of the display mode LB is lowered with respect to the example illustrated in FIG. 6. For example, the order of switching display modes in a toggle manner is an order of the display mode LA, the display mode LC, the display mode LB, the display mode LA, . . . (the same order thereafter).

(Configuration of Information Processing Apparatus 10)

Hereinafter, a specific configuration of the information processing apparatus 10 will be described.

Figure 13:
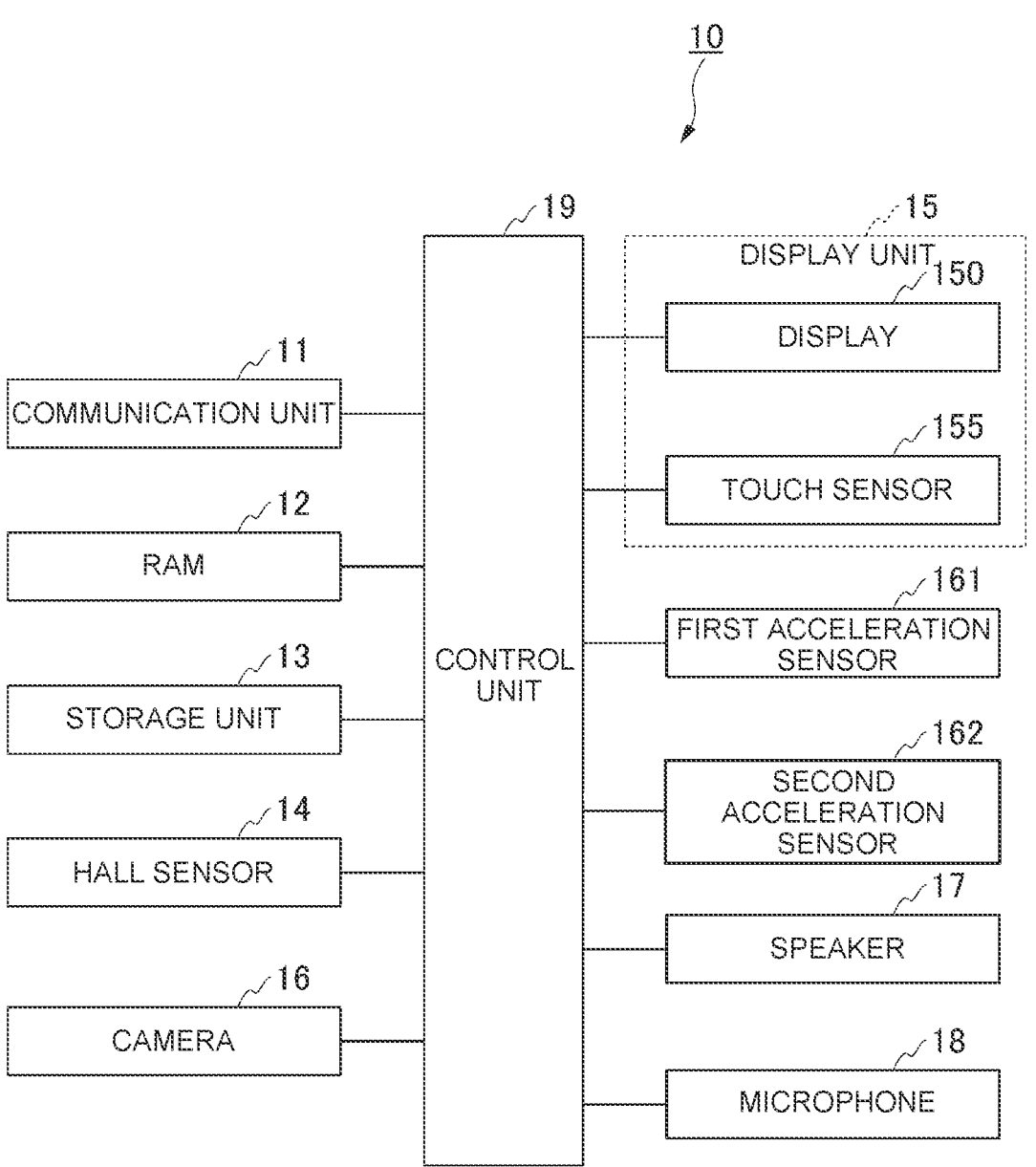
FIG. 13 is a block diagram illustrating an example of a hardware configuration of the information processing apparatus according to the first embodiment.

FIG. 13 is a block diagram illustrating an example of a hardware configuration of the information processing apparatus 10 according to the present embodiment. The information processing apparatus 10 includes a communication unit 11, a random access memory (RAM) 12, a storage unit 13, a hall sensor 14, a display unit 15, a camera 16, a first acceleration sensor 161, a second acceleration sensor 162, a speaker 17, a microphone 18, and a control unit 19. These constituents are communicatively connected to each other via a bus or the like.

The communication unit 11 includes digital input/output ports such as a plurality of Ethernet (registered trademark) ports or a plurality of Universal Serial Bus (USB) ports, and a communication device that performs wireless communication such as Bluetooth (registered trademark) or Wi-Fi (registered trademark). For example, the communication unit 11 can communicate with the external keyboard 30 and the like described above by using Bluetooth (registered trademark).

A program or data for processing executed by the control unit 19 is loaded in the RAM 12, and various types of data are stored or deleted as appropriate. For example, the RAM 12 also functions as a video memory (V-RAM) that temporarily stores display data to be displayed on the display 150. As an example, the RAM 12 functions as a video memory of data displayed in the screen region DA when the display 150 is controlled in a one-screen mode. The RAM 12 functions as a video memory of data displayed in the first screen region DA1 and the second screen region DA2 when the display 150 is controlled in a two-screen mode. The RAM 12 functions as a video memory of data displayed in the first screen region DA1 when the display 150 is controlled in the half screen mode. Since the RAM 12 is a volatile memory, the data is not stored when the supply of power to the RAM 12 is stopped. The data that needs to be stored when the supply of power to the RAM 12 is stopped is transferred to the storage unit 13.

The storage unit 13 includes one or more of a solid state drive (SSD), a hard disk drive (HDD), a read only memory (ROM), a Flash-ROM, and the like. For example, the storage unit 13 stores a basic input output system (BIOS) program and setting data, an operating system (OS), a program of an application running on the OS, various data used in the application, and the like.

The hall sensor 14 is provided to detect a connection of the keyboard 30. For example, when the keyboard 30 is placed on the second screen region DA2 of the second chassis 102, a magnetic field changes due to approaching of the magnet provided inside the bottom surface of the keyboard 30, and a detected value (output value) from the hall sensor 14 changes. That is, the hall sensor 14 outputs different detection results depending on whether or not the keyboard 30 is placed.

The display unit 15 includes a display 150 and a touch sensor 155. As described above, the display 150 is a flexible display that can be bent according to the opening angle θ due to relative rotation of the first chassis 101 and the second chassis 102. The display 150 performs display corresponding to each display mode described with reference to FIG. 4, according to the control of the control unit 19. The touch sensor 155 is provided on a screen of the display 150, and detects a touch operation on the screen. For example, the touch sensor 155 detects a touch operation on the screen region DA in the one-screen mode. The touch sensor 155 detects a touch operation on one or both of the first screen region DA1 and the second screen region DA2 in the two-screen mode. The touch operation includes a tap operation, a slide operation, a flick operation, a swipe operation, a pinch operation, and the like. The touch sensor 155 detects a touch operation and outputs operation information based on the detected operation to the control unit 19.

The camera 16 includes a lens, an imaging element, and the like. The camera 16 captures an image (a still image or a moving image) according to the control of the control unit 19, and outputs data of the captured image.

The first acceleration sensor 161 is provided inside the first chassis 101, and detects an orientation of the first chassis 101 and a change in the orientation. For example, assuming that a direction parallel to the longitudinal direction of the first screen region DA1 is an X1 direction, a direction parallel to the lateral direction is a Y1 direction, and a direction perpendicular to the X1 direction and the Y1 direction is a Z1 direction, the first acceleration sensor 161 detects respective accelerations in the X1 direction, the Y1 direction, and the Z1 direction, and outputs the detection results to the control unit 19.

The second acceleration sensor 162 is provided inside the second chassis 102, and detects an orientation of the second chassis 102 and a change in the orientation. For example, assuming that a direction parallel to the longitudinal direction of the second screen region DA2 is an X2 direction, a direction parallel to the lateral direction is a Y2 direction, and a direction perpendicular to the X2 direction and the Y2 direction is a Z2 direction, the second acceleration sensor 162 detects respective accelerations in the X2 direction, the Y2 direction, and the Z2 direction, and outputs the detection results to the control unit 19.

The speaker 17 outputs electronic sounds, voices, and the like.

The microphone 18 is a microphone (voice collecting unit) that collects ambient voice.

The control unit 19 includes a processor such as a central processing unit (CPU), a graphic processing unit (GPU), or a microcomputer, and realizes various functions by the processor executing programs (various programs such as a BIOS, an OS, and applications running on the OS) stored in the storage unit 13 or the like.

For example, the control unit 19 detects an attitude (orientation) of the information processing apparatus 10 on the basis of the detection results from the first acceleration sensor 161 and the second acceleration sensor 162. The control unit 19 determines, on the basis of the detection results from the first acceleration sensor 161 and the second acceleration sensor 162, whether the information processing apparatus 10 is in an open state, a closed state, or whether the information processing apparatus 10 is in a bent state (bent form) or a flat state (flat form) in the open state, or the like. The control unit 19 detects whether or not there is a connection with the keyboard 30. The control unit 19 controls a display mode according to these detection results, a user operation input, or the like.

(Functional Configuration of Control Unit 19)

Next, a functional configuration related to a display mode switching process in which the control unit 19 switches display modes according to operation input on a shortcut key will be described.

Figure 14:
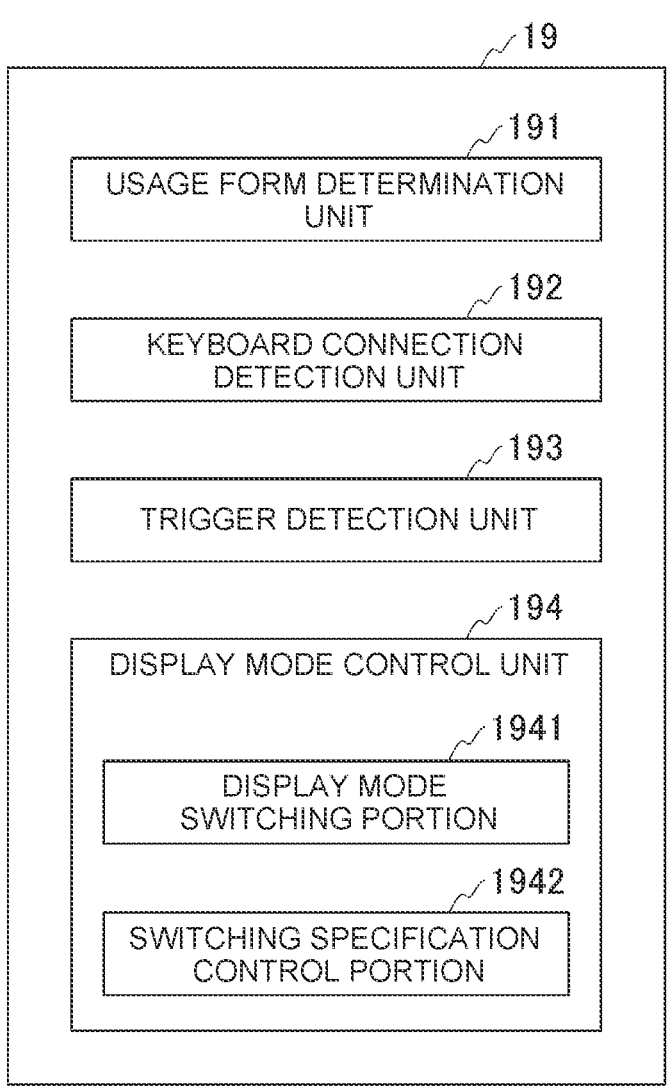
FIG. 14 is a block diagram illustrating an example of a functional configuration related to a display mode switching process of the information processing apparatus according to the first embodiment.

FIG. 14 is a block diagram illustrating an example of a functional configuration related to the display mode switching process according to the present embodiment. The control unit 19 includes, for example, a usage form determination unit 191, a keyboard connection detection unit 192, a trigger detection unit 193, and a display mode control unit 194, as a functional configuration in which the CPU executes processing on the basis of a program running on the OS, for example.

The usage form determination unit 191 determines a usage form of the information processing apparatus 10 (display 150). This usage form is various states of the information processing apparatus 10 (display 150), and is based on either or both of at least whether or not the information processing apparatus 10 (display 150) is in a bent state and an orientation of the information processing apparatus 10 (display 150).

For example, the usage form determination unit 191 determines whether the information processing apparatus 10 is in a bent state (bent form) or a flat state (flat form) on the basis of the detection results from the first acceleration sensor 161 and the second acceleration sensor 162. The usage form determination unit 191 determines whether an orientation of the display 150 is "landscape" or "portrait" on the basis of the detection results from the first acceleration sensor 161 and the second acceleration sensor 162. The usage form determination unit 191 may determine whether the information processing apparatus 10 is in an open state or a closed state on the basis of the detection results from the first acceleration sensor 161 and the second acceleration sensor 162.

The keyboard connection detection unit 192 detects a connection with the keyboard 30. For example, the keyboard connection detection unit 192 detects whether or not the keyboard 30 is placed on the second screen region DA2 on the basis of a detection result from the hall sensor 14, and thus detects the presence or absence of the connection with the keyboard 30. The keyboard connection detection unit 192 may detect the connection with the keyboard 30 according to whether or not a communication connection is made with the keyboard 30 via the communication unit 11. The keyboard connection detection unit 192 may detect a connection with an external keyboard other than the keyboard 30 depending on whether or not the connection with an external keyboard other than the keyboard 30 is communicated and connected via the communication unit 11.

The trigger detection unit 193 detects a trigger for switching display modes in a toggle manner. For example, the trigger detection unit 193 acquires an operation signal corresponding to operation input on the keyboard 30 (or another external keyboard) via the communication unit 11, and detects operation input on a shortcut key as the trigger on the basis of the acquired operation signal. Each time the trigger detection unit 193 detects operation input on the shortcut key, the trigger detection unit 193 transmits to the fact of detecting the operation input to the display mode control unit 194.

The display mode control unit 194 controls display according to each of the plurality of display modes, and controls switching of the display modes. As illustrated in FIG. 4, the plurality of display modes are determined according to, for example, a combination of screen region control for controlling to display a screen region of the display 150 as one screen region DA or as a plurality of screen regions (for example, the first screen region DA1 and the second screen region DA2) and a display direction control for controlling a display orientation on the screen region of the display 150. The plurality of display modes are determined according to, in addition to the above screen region control and the above display direction control, which screen region is set as a primary screen when the screen region is controlled to be displayed as a plurality of screen regions.

For example, the display mode control unit 194 performs the screen region control for controlling to display the screen region of the display 150 as one screen region DA or as a plurality of screen regions (for example, the first screen region DA1 and the second screen region DA2) according to each display mode. The display mode control unit 194 performs the display direction control for controlling a display orientation on the screen region of the display 150 according to each display mode. The display mode control unit 194 controls which screen region is set as a primary screen when the screen region is controlled to be displayed as a plurality of screen regions according to each display mode.

The display mode control unit 194 includes a display mode switching portion 1941 and a switching specification control portion 1942 as a configuration that controls switching of the display modes. The display mode switching portion 1941 performs a display mode switching process of switching display modes of the display 150 in a predetermined order each time operation input on the shortcut key is detected by the trigger detection unit 193.

The switching specification control portion 1942 restricts a switchable display mode among the plurality of display modes according to a usage form determined by the usage form determination unit 191. Here, restricting the switchable display modes among the plurality of display modes means, in other words, that only some of the plurality of display modes can be switched.

For example, the switching specification control portion 1942 restricts a switchable display mode according to an orientation of the display 150. Specifically, as an example, as described with reference to FIG. 6, the switching specification control portion 1942 restricts a switchable display mode to a display mode in a case of "landscape" in a case where a usage form is "landscape". As another example, as described with reference to FIG. 7, the switching specification control portion 1942 restricts a switchable display mode to a display mode in a case of "portrait" in a case where a usage form is "portrait".

The switching specification control portion 1942 may restrict a switchable display mode to only a two-screen mode in a case of a bent state (bent form) (refer to FIGS. 8 and 9).

The switching specification control portion 1942 may further perform a history storage process of storing a history of a display mode selected by a user for each usage form. The switching specification control portion 1942 may restrict a switchable display mode by excluding a display mode selected infrequently by the user for each usage form from switchable display modes (refer to FIG. 10).

The switching specification control portion 1942 changes a predetermined order of switching a plurality of display modes according to a usage form determined by the usage form determination unit 191. For example, in a bent state (bent form), the switching specification control portion 1942 sets a predetermined order of switching display modes to an order in which a display mode corresponding to a two-screen mode is prioritized (refer to FIGS. 6 and 7). On the other hand, in a flat state (flat form), the switching specification control portion 1942 sets a predetermined order of switching display modes to an order in which a display mode corresponding to a one-screen mode is prioritized (refer to FIG. 11).

The switching specification control portion 1942 may set a predetermined order of switching display modes to an order in which a display mode selected frequently by the user for each usage form among the plurality of display modes is prioritized (refer to FIG. 12).

(Operation of Display Mode Control Process)

Next, an operation of the display mode switching process in which the control unit 19 switches display modes in a toggle manner according to a user's operation will be described.

Figure 15:
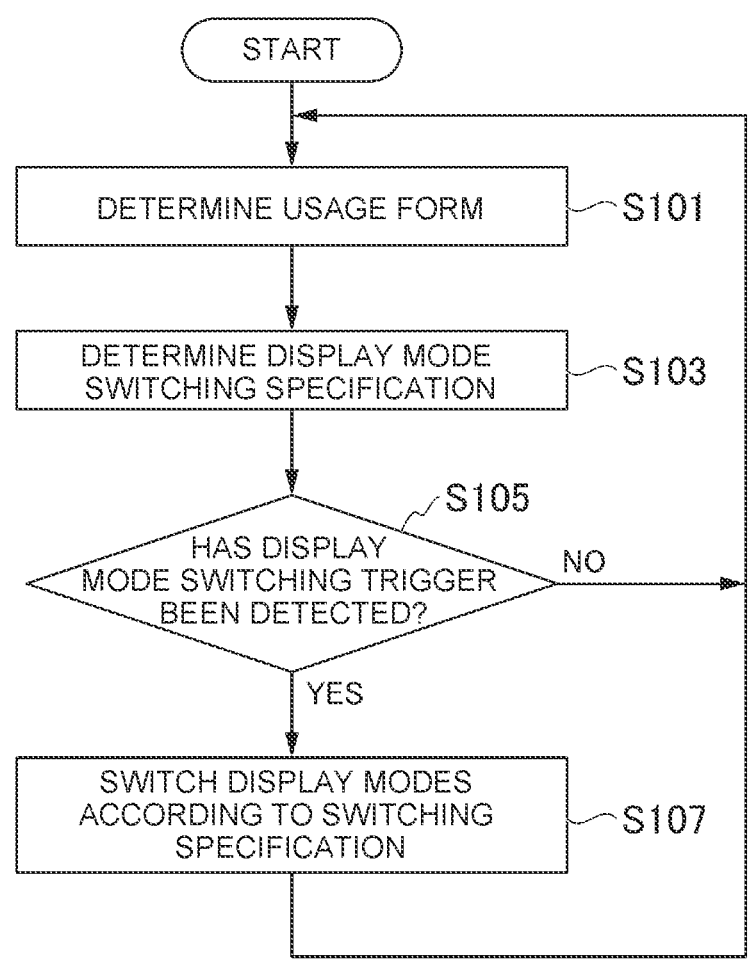
FIG. 15 is a flowchart illustrating an example of a display mode switching process according to the first embodiment.

FIG. 15 is a flowchart illustrating an example of the display mode switching process according to the present embodiment.

(Step S101) The control unit 19 determines a usage form of the information processing apparatus 10 (display 150). For example, the control unit 19 determines whether the information processing apparatus 10 is in a bent state (bent form) or a flat state (flat form). The control unit 19 determines whether an orientation of the display 150 is "landscape" or "portrait". The process proceeds to step S103.

(Step S103) The control unit 19 determines a display mode switching specification according to the usage form determined by the usage form determination unit 191. Specifically, as illustrated in FIGS. 6 to 12, the control unit 19 determines a restriction of a switchable display mode among the plurality of display modes, the order of switching, and the like. The process proceeds to step S105.

(Step S105) The control unit 19 determines whether or not a display mode switching trigger for switching display modes in a toggle manner has been detected. For example, the display mode switching trigger is operation input on a specific shortcut key (for example, F5+Ctrl). In a case where the control unit 19 determines that the display mode switching trigger has not been detected (NO), the process returns to step S101. On the other hand, in a case where the control unit 19 determines that the display mode switching trigger has been detected (YES), the process proceeds to step S107.

(Step S107) The control unit 19 switches display modes according to the display mode switching specification determined in step S103. The process returns to step S101. By repeatedly performing this display mode switching process, the control unit 19 switches display modes in a toggle manner according to the display mode switching specification determined in step S103 each time the display mode switching trigger is detected.

In a case where operation input on a specific shortcut key is used as the display mode switching trigger, it is assumed that the keyboard 30 (or another external keyboard) is connected. In a case where the keyboard 30 (or another external keyboard) is not connected, operation input on the specific shortcut key cannot be performed, so that the display mode switching process is invalid.

As described above, the information processing apparatus according to the present embodiment has one foldable display 150, the RAM 12 (an example of a memory) that temporarily stores display data to be displayed on the display 150, and the control unit 19 (example of a processor) that performs control when the display data stored in the RAM 12 is displayed on the display 150. The control unit 19 performs the display mode switching process of switching a plurality of display modes in a predetermined order in a toggle manner each time a user performs specific input (for example, input of a display mode switching trigger), the plurality of display modes being determined according to a combination of screen region control for controlling to display a screen region of the display 150 as one screen region DA or as a plurality of screen regions (for example, the first screen region DA1 and the second screen region DA2) and a display direction control for controlling a display orientation on the screen region of the display 150.

The control unit 19 performs a display mode restricting process of restricting a display mode that can be switched in the display mode switching process among the plurality of display modes according to a usage form of the display 150.

As a result, the information processing apparatus 10 can switch only display modes according to the usage form among the plurality of display modes in a toggle manner each time an operation is performed, so that the plurality of display modes can be easily switched.

The control unit 19 performs a display mode order change process of changing a predetermined order when a plurality of display modes are switched in the display mode switching process according to a usage form of the display 150.

As a result, the information processing apparatus 10 can switch the plurality of display modes in a toggle manner each time an operation is performed in an order according to a usage form, so that the plurality of display modes can be easily switched.

In addition to the screen region control and the display direction control, the plurality of display modes are further determined according to which screen region is used as a primary screen when a screen region is controlled to be displayed as a plurality of screen regions.

As a result, the information processing apparatus 10 can easily switch a screen region to the screen region to be used as the primary screen.

A usage form of the display 150 is based on at least one or both of whether or not the display 150 is in a bent state and an orientation of the display 150.

Consequently, the information processing apparatus 10 can easily switch a plurality of display modes depending on whether or not the display 150 is in a bent state or an orientation of the display 150.

The control unit 19 further performs a history storage process of storing a history of a display mode selected by a user for each usage form of the display 150. In the above display mode restricting process, the control unit 19 may exclude a display mode that is selected infrequently by a user for each usage form of the display 150 among the plurality of display modes from a display mode that can be switched through the display mode switching process.

As a result, in the information processing apparatus 10, only display modes frequently used by the user among the plurality of display modes are switched in a toggle manner each time an operation is performed, so that the user can easily switch to a desired display mode.

In the display mode order change process, the control unit 19 may set a predetermined order when a plurality of display modes are switched in the display mode switching process to an order in which a display mode selected frequently by a user among a plurality of display modes for each usage form of the display 150 is prioritized.

As a result, the information processing apparatus 10 switches the plurality of display modes in a toggle manner each time an operation is performed in the order of the display mode frequently used by the user among the plurality of display modes, so that the user can easily switch to a desired display mode.

Here, the specific input by the user (for example, input of the display mode switching trigger) is operation input on a specific shortcut key (for example, F5+Ctrl) on the keyboard 30 (or another external keyboard) connected to the information processing apparatus 10.

As a result, the information processing apparatus 10 can switch display modes in a toggle manner each time the user performs one operation with the shortcut key, and thus a plurality of display modes can be easily switched.

The control method in the information processing apparatus according to the present embodiment includes causing the control unit 19 to execute a step of switching a plurality of display modes in a predetermined order in a toggle manner each time a user performs specific input (for example, input of a display mode switching trigger), the plurality of display modes being determined according to a combination of screen region control for controlling to display a screen region of the display 150 as one screen region DA or as a plurality of screen regions (for example, the first screen region DA1 and the second screen region DA2) and a display direction control for controlling a display orientation on the screen region of the display 150, and a step of restricting display modes that are switchable among the plurality of display modes according to a usage form of the display 150.

As a result, the information processing apparatus 10 can switch only display modes according to the usage form among the plurality of display modes in a toggle manner each time an operation is performed, so that the plurality of display modes can be easily switched.

The control method in the information processing apparatus according to the present embodiment includes a step of causing the control unit 19 to switch a plurality of display modes in a predetermined order in a toggle manner each time a user performs specific input (for example, input of a display mode switching trigger), the plurality of display modes being determined according to a combination of screen region control for controlling to display a screen region of the display 150 as one screen region DA or as a plurality of screen regions (for example, the first screen region DA1 and the second screen region DA2) and a display direction control for controlling a display orientation on the screen region of the display 150, and a step of changing a predetermined order when the plurality of display modes are switched, according to a usage form of the display 150.

As a result, the information processing apparatus 10 can switch the plurality of display modes in a toggle manner each time an operation is performed in an order according to a usage form, so that the plurality of display modes can be easily switched.

Second Embodiment

Next, a second embodiment will be described.

In the first embodiment, although an example in which display modes are switched in a toggle manner each time operation input on a specific shortcut key (for example, F5+Ctrl) of the keyboard 30 (or another external keyboard) connected to the information processing apparatus 10 is performed has been described, instead of the shortcut key, the display modes may be switched each time specific operation input on a touch pad provided on the keyboard 30 (or another external keyboard) is performed.

Figure 16:
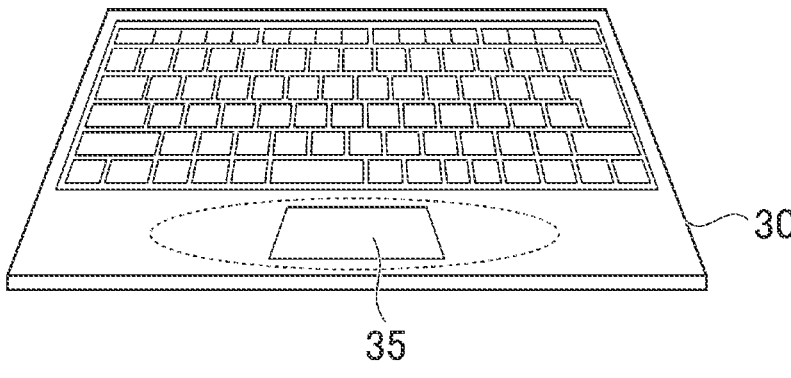
FIG. 16 is a diagram illustrating an example of a trigger for switching display modes according to a second embodiment.

FIG. 16 is a diagram illustrating an example of a trigger for switching display modes according to the present embodiment. As illustrated, specific operation input on the touch pad 35 provided on the keyboard 30 may be set as operation input that is a trigger when display modes are switched in a toggle manner. The specific operation input on the touch pad 35 is, for example, a swipe operation with two fingers. The specific operation input on the touch pad 35 may be freely determined in consideration of other operations. In a case where not only the keyboard 30 but also another external keyboard including a touch pad is connected to the information processing apparatus 10, the information processing apparatus 10 can similarly switch display modes by using the touch pad provided on the connected keyboard.

As described above, in the information processing apparatus 10 according to the present embodiment, specific input (input of a display mode switching trigger) when display modes are switched in a toggle manner is specific operation input on the keyboard 30 (or another external keyboard) connected to the information processing apparatus 10.

As a result, the information processing apparatus 10 can switch display modes in a toggle manner each time a user performs one operation on the touch pad, and thus a plurality of display modes can be easily switched.

Third Embodiment

Next, a third embodiment will be described.

In the first and second embodiments, although an example of the display mode switching process has been described in which, each time operation input (operation input on a shortcut key or a touch pad) is performed on the keyboard 30 (or another external keyboard) connected to the information processing apparatus 10, display modes are switched in a toggle manner, the display mode switching process based on operation input on the keyboard may be controlled to be enabled or disabled depending on a usage form.

For example, the information processing apparatus 10 enables the display mode switching process based on operation input on a shortcut key only in a bent state (bent form), and disables the display mode switching process using the shortcut key in a flat state (flat form). Similarly, the information processing apparatus 10 may enable the display mode switching process based on operation input on the touch pad only in a bent state (bent form), and disable the display mode switching process based on operation input on the touch pad in a flat state (flat form).

Hereinafter, an operation of a process in which the control unit 19 controls to enable (on) or disable (off) the display mode switching process based on operation input on a keyboard according to a usage form will be described with reference to FIG. 17.

Figure 17:
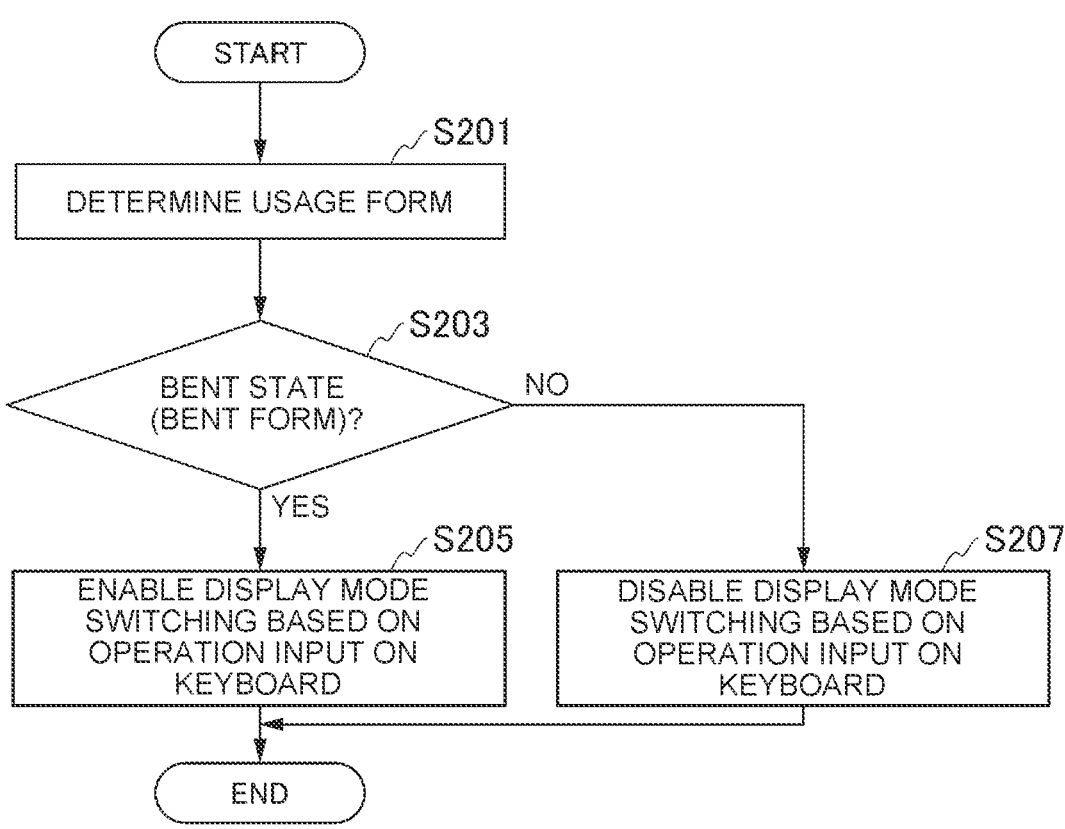
FIG. 17 is a flowchart illustrating an example of on/off of a display mode switching process using a keyboard according to a third embodiment.

FIG. 17 is a flowchart illustrating an example of on/off of the display mode switching process using a keyboard according to the present embodiment.

(Step S201) The control unit 19 determines a usage form of the information processing apparatus 10 (display 150). For example, the control unit 19 determines whether the information processing apparatus 10 is in a bent state (bent form) or a flat state (flat form). The process proceeds to step S203.

(Step S203) In a case where the control unit 19 determines that the information processing apparatus 10 is in a bent state (bent form) (YES), the process proceeds to step S205. On the other hand, in a case where the control unit 19 determines that the information processing apparatus 10 is not in a bent state (bent form) (NO), the process proceeds to step S207.

(Step S205) The control unit 19 enables the display mode switching process based on operation input on the keyboard (operation input on a shortcut key or a touch pad).

(Step S207) The control unit 19 disables the display mode switching process based on operation input on the keyboard (operation input on a shortcut key or a touch pad).

As described above, in the information processing apparatus 10 according to the present embodiment, the control unit 19 controls to enable the display mode switching process based on operation input on the keyboard 30 (or another external keyboard) according to a usage form of the display 150.

Consequently, the information processing apparatus 10 can appropriately control an operation method for the display mode switching process according to a usage form.

For example, in a case where the display 150 is in a bent state (bent form), the control unit 19 enables the display mode switching process based on operating input on the keyboard 30 (or another external keyboard). On the other hand, in a case where the display 150 is in a state in which the display 150 is not bent (that is, a flat state (flat form)), the display mode switching process based on operation input on the keyboard 30 (or another external keyboard) is disabled.

As a result, since a possibility that the keyboard is used is low in a flat state (flat form) of the information processing apparatus 10, the display mode switching process based on operation input on the keyboard may be disabled, and only in a bent state (bent form), the display mode switching process based on operation input on the keyboard may be enabled. Therefore, the information processing apparatus 10 can appropriately control an operation method for the display mode switching process according to a usage form.

Fourth Embodiment

Next, a fourth embodiment will be described.

In the first and second embodiments, although an example of the display mode switching process has been described in which, each time operation input (operation input on a shortcut key or a touch pad) is performed on the keyboard 30 (or another external keyboard) connected to the information processing apparatus 10, display modes are switched in a toggle manner, the display modes may be switched each time specific operation input on the display 150 is performed instead of the keyboard.

Figure 18:
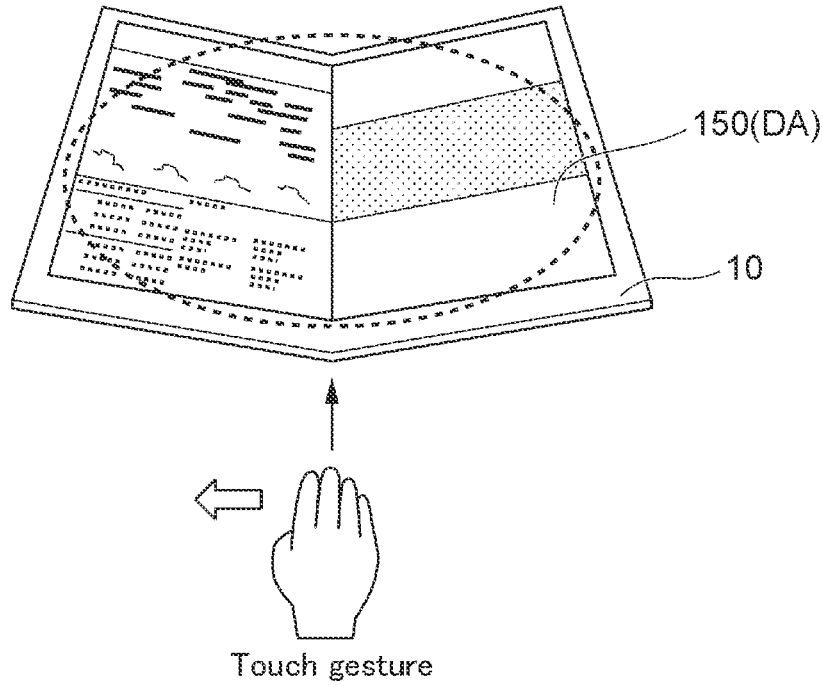
FIG. 18 is a diagram illustrating an example of a trigger for switching display modes according to a fourth embodiment.

FIG. 18 is a diagram illustrating an example of a trigger for switching display modes according to the present embodiment. As illustrated, specific touch operation (touch gesture) input on the screen region DA of the display 150 may be set as operation input that is a trigger when display modes are switched in a toggle manner. The specific touch operation (touch gesture) input on the display 150 is, for example, a swipe operation using four fingers. The specific touch operation (touch gesture) input on the display 150 may be freely determined in consideration of other operations.

As described above, in the information processing apparatus according to the present embodiment, specific input (input of a display mode switching trigger) when switching display modes in a toggle manner is specific touch operation (touch gesture) input on the display 150.

As a result, the information processing apparatus 10 can switch display modes in a toggle manner each time a user performs one operation on the display 150, and thus a plurality of display modes can be easily switched.

The information processing apparatus 10 may control to enable or disable the display mode switching process based on operation input (touch gesture) on the display 150, according to a usage form. For example, in a case where it is estimated that the information processing apparatus 10 is in a state of being held by a user, the information processing apparatus 10 may enable the display mode switching process based on operation input (touch gesture) on the display 150. On the other hand, in a case where the information processing apparatus 10 is not in a state of being held by the user (for example, in a case where the information processing apparatus 10 is placed on a desk or the like), the information processing apparatus 10 may disable the display mode switching process based on operation input (touch gesture) on the display 150.

Hereinafter, an operation of a process in which the control unit 19 controls to enable (on) or disable (off) the display mode switching process based on operation input (touch gesture) on the display 150 according to a usage form will be described with reference to FIG. 19.

Figures 19, 20:
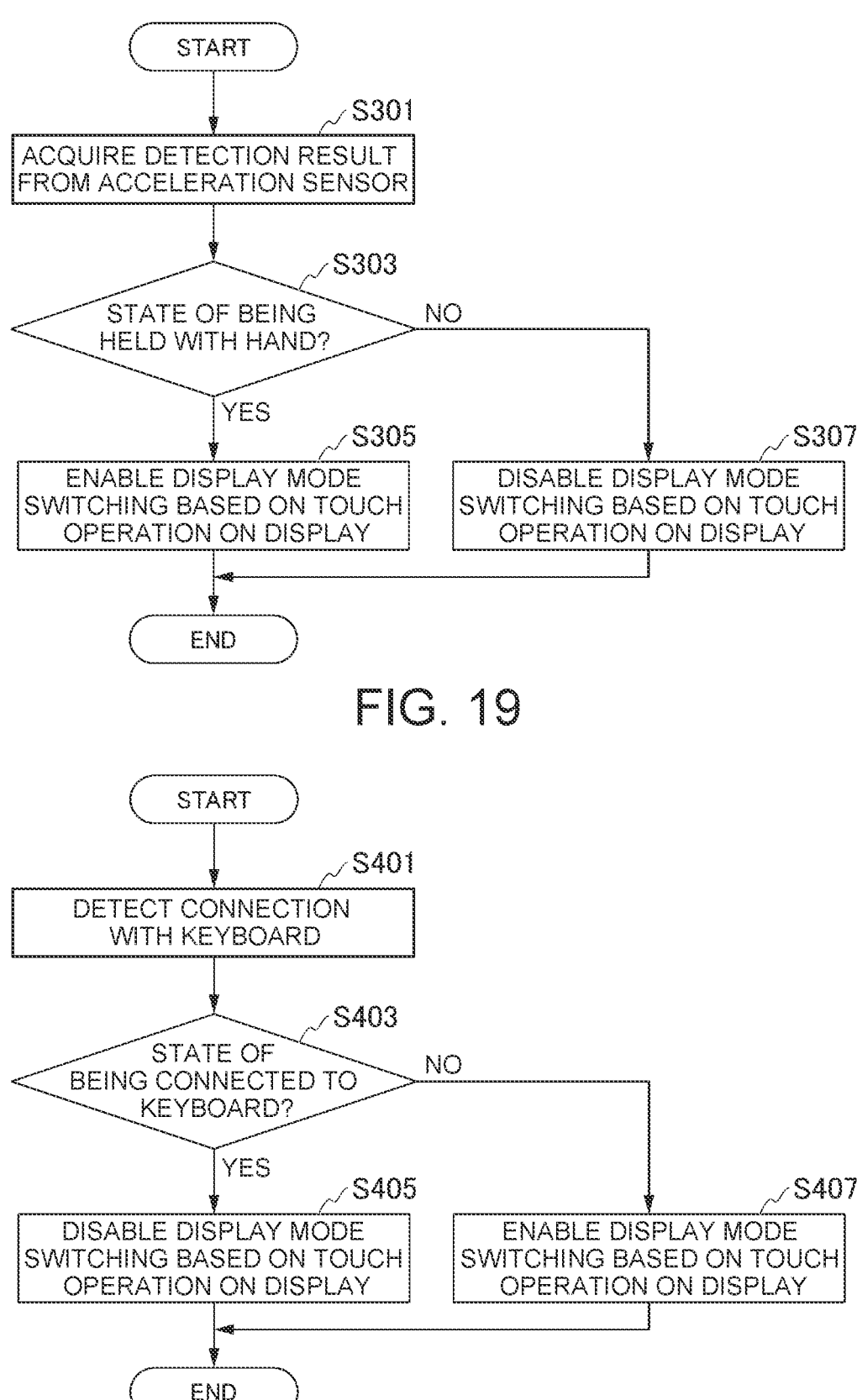
FIG. 19 is a flowchart illustrating a first example of on/off of a display mode switching process based on a touch operation on a display according to the fourth embodiment.
FIG. 20 is a flowchart illustrating a second example of on/off of a display mode switching process based on a touch operation on the display according to the fourth embodiment.

FIG. 19 is a flowchart illustrating a first example of on/off of the display mode switching process based on a touch operation on the display 150 according to the present embodiment.

(Step S301) The control unit 19 acquires detection results from the first acceleration sensor 161 and the second acceleration sensor 162, and detects shaking of the information processing apparatus 10 on the basis of the acquired detection results. The process proceeds to step S303.

(Step S303) The control unit 19 determines whether or not the information processing apparatus 10 is in a state of being held by a user on the basis of the shaking of the information processing apparatus 10 detected in step S301. For example, the control unit 19 determines that the information processing apparatus 10 is in a state of being held by the user in a case where the shaking is equal to or more than a predetermined value, and the control unit 19 determines that the information processing apparatus 10 is not in a state of being held by the user in a case where the shaking is less than the predetermined value (for example, the information processing apparatus 10 is in a state of being placed on a desk or the like). In a case where the control unit 19 determines that the information processing apparatus 10 is in a state of being held by the user (YES), the process proceeds to step S305. On the other hand, in a case where the control unit 19 determines that the information processing apparatus 10 is not in a state of being held by the user (NO), the process proceeds to step S307.

(Step S305) The control unit 19 enables the display mode switching process based on operation input (touch gesture) on the display 150.

(Step S307) The control unit 19 disables the display mode switching process by the operation input (touch gesture) on the display 150.

When the control unit 19 determines whether or not the information processing apparatus 10 is in a state of being held by the user, instead of or in addition to the determination based on the presence or absence of shaking of the information processing apparatus 10, the determination may be performed on the basis of whether or not the opening angle θ has changed (whether or not the opening angle is changing). That is, when the opening angle θ is changing, it may be determined that the information processing apparatus 10 is in a state of being held by the user.

As described above, the control unit 19 controls to enable or disable the display mode switching process based on operation input (touch gesture) on the display 150 according to a usage form of the display 150.

Consequently, the information processing apparatus 10 can appropriately control an operation method for the display mode switching process according to a usage form.

For example, the control unit 19 determines whether or not the information processing apparatus 10 is in a state of being held by the user, and in a case where it is determined that the information processing apparatus 10 is in a state of being held by the user, enables the display mode switching process based on operation input on the display 150. On the other hand, in a case where it is determined that the information processing apparatus 10 is not in a state of being held by the user, the control unit 19 disables the display mode switching process based on operation input on the display 150.

As a result, it is considered that the information processing apparatus 10 is not using the keyboard 30 (or another external keyboard) in a state in which the information processing apparatus 10 is in a state of being held by the user. Therefore, the information processing apparatus 10 enables the display mode switching process based on operation input on the display 150 such that the user can easily switch display modes.

The information processing apparatus 10 may control to enable or disable the display mode switching process based on operation input (touch gesture) on the display 150 according to the presence or absence of connection with the keyboard 30 (or another external keyboard). For example, in a case where the information processing apparatus 10 is not connected to the keyboard 30 (or another external keyboard), the display mode switching process based on operation input (touch gesture) on the display 150 may be enabled, and in a case where connection with the keyboard 30 (another external keyboard) is detected, the display mode switching process based on operation input (touch gesture) on the display 150 may be disabled.

Hereinafter, an operation of a process of in which the control unit 19 controls to enable (on) or disable (off) the display mode switching process based on operation input (touch gesture) on the display 150 depending on the presence or absence of connection with a keyboard will be described with reference to FIG. 20.

FIG. 20 is a flowchart illustrating a second example of on/off of the display mode switching process based on a touch operation on the display 150 according to the present embodiment.

(Step S401) The control unit 19 detects a connection with the keyboard 30 (or another external keyboard). For example, in a case where the control unit 19 detects the presence or absence of a connection with the keyboard 30 is connected, the control unit 19 detects the presence or absence of the connection by detecting whether or not the keyboard 30 is placed on the second screen region DA2 on the basis of a detection result from the hall sensor 14. The control unit 19 may detect the connection with the keyboard 30 depending on whether or not a communication connection is made with the keyboard 30 via the communication unit 11. In a case where the control unit 19 detects a connection with an external keyboard other than the keyboard 30, the control unit 19 detects the connection according to whether or not a communication connection is made with the keyboard 30 via the communication unit 11. The process proceeds to step S403.

(Step S403) The control unit 19 determines whether or not the information processing apparatus 10 is in a state of being connected to the keyboard 30 (or another external keyboard) on the basis of the detection result in step S401. In a case where the control unit 19 determines that the information processing apparatus 10 is in a state of being connected to the keyboard 30 (or another external keyboard) (YES), the process proceeds to step S405. On the other hand, in a case where the control unit 19 determines that the information processing apparatus 10 is not in a state of being connected to the keyboard 30 (or another external keyboard) (NO), the process proceeds to step S407.

(Step S405) The control unit 19 disables the display mode switching process based on operation input (touch gesture) on the display 150.

(Step S407) The control unit 19 enables the display mode switching process based on operation input (touch gesture) on the display 150.

As described above, in a case where the connection of the keyboard 30 (or another external keyboard) is detected, the control unit 19 disables the display mode switching process based on operation input on the display 150.

Consequently, in a case where a user is using the keyboard 30 (or another external keyboard) in the information processing apparatus 10, it is possible to easily switch display modes by using the shortcut key or the touch pad described in the first to third embodiments. Therefore, a processing load can be reduced or an erroneous operation can be prevented by disabling the display mode switching process based on operation input on the display 150.

Fifth Embodiment

Next, a fifth embodiment will be described.

In the present embodiment, an example of switching display modes in a toggle manner with a user performing a specific gesture for the camera 16 as trigger input will be described.

Figure 21:
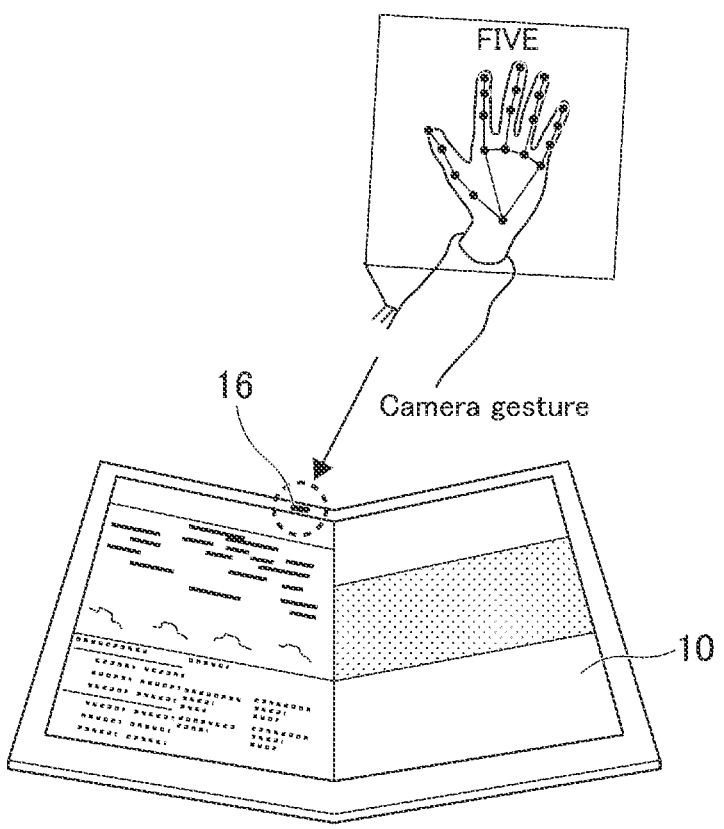
FIG. 21 is a diagram illustrating an example of a trigger for switching display modes according to a fifth embodiment.

FIG. 21 is a diagram illustrating an example of a trigger for switching display modes according to the present embodiment. As illustrated, performing a specific gesture for the camera 16 may be a trigger for switching display modes in a toggle manner. The specific gesture is, for example, a specific hand sign. A specific gesture such as a hand sign may be freely determined in consideration of other gestures (operation input).

For example, the control unit 19 performs a gesture image detection process of detecting a specific gesture image from a captured image that is captured by the camera 16 (an example of an imaging unit). The control unit 19 executes a display mode switching process of switching display modes in a toggle manner each time a specific gesture image is detected through the gesture image detection process.

As a result, the information processing apparatus 10 can switch display modes in a toggle manner each time a user performs a specific gesture once, and thus a plurality of display modes can be easily switched.

Sixth Embodiment

Next, a sixth embodiment will be described.

In the present embodiment, an example of switching display modes in a toggle manner with a user performing specific voice input as trigger input will be described.

Figure 22:
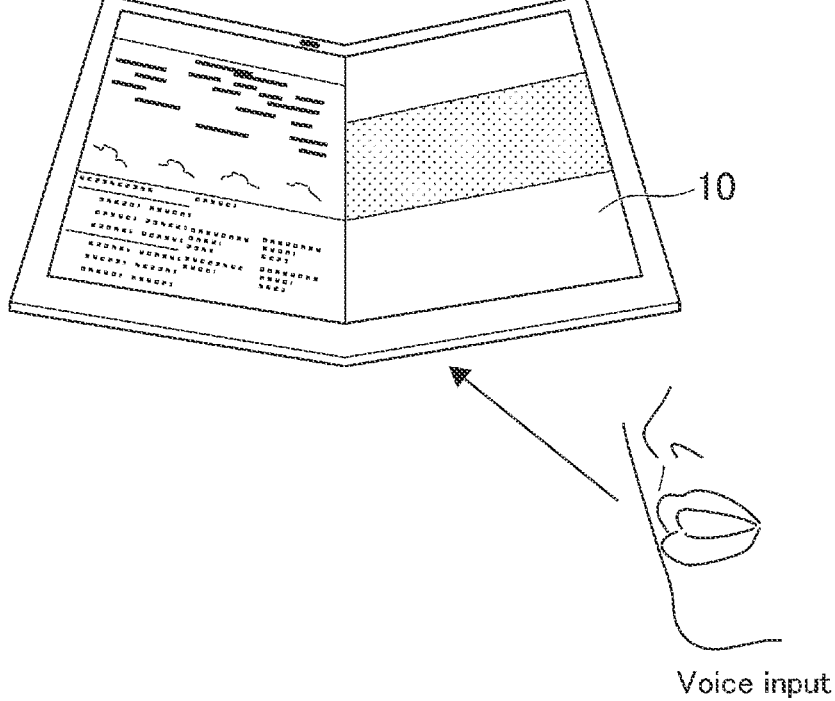
FIG. 22 is a diagram illustrating an example of a trigger for switching display modes according to a sixth embodiment.

FIG. 22 is a diagram illustrating an example of a trigger for switching display modes according to the present embodiment. As illustrated, performing specific voice input using a user's speech may be a trigger when display modes are switched in a toggle manner. The specific voice is, for example, "display mode" or "change the display mode". The specific voice may be freely determined in consideration of commands using other voices.

For example, the control unit 19 performs a voice detection process of detecting a specific voice from voices collected by the microphone 18. The control unit 19 executes a display mode switching process of switching display modes in a toggle manner each time a specific voice is detected through the voice detection process.

As a result, the information processing apparatus 10 can switch display modes in a toggle manner each time a user performs specific voice input once, and thus a plurality of display modes can be easily switched.

Although the embodiments of the present invention have been described in detail with reference to the drawings above, a specific configuration is not limited to the above-described configuration, and various design changes and the like can be made without departing from the concept of the present invention. For example, the configurations described in each of the above embodiments may be freely combined.

In the above-described embodiments, the example of the one-screen mode in which the screen region of the display 150 is controlled to be displayed as one screen region DA and the two-screen mode in which the screen region is divided into two screen regions such as the first screen region DA1 and the second screen region DA2 has been described, but in a case where the screen region of the display 150 is divided, the present invention is not limited to dividing the screen region into two screen regions, and the screen region may be divided into three or more screen regions.

The information processing apparatus 10 described above has a computer system inside. The process in each configuration of the information processing apparatus 10 described above may be performed by recording a program for realizing the functions of each configuration included in the above-described information processing apparatus 10 and reading and executing the program recorded on the recording medium with a computer system. Here, "reading and executing the program recorded on the recording medium with the computer system" includes installing the program in the computer system. The term "computer system" as stated herein includes hardware such as an OS and peripheral devices. The "computer system" may include a plurality of computer devices connected via a network including a communication line such as the Internet, a WAN, a LAN, and a dedicated line. The "computer-readable recording medium" is a portable medium such as a flexible disk, a magneto-optical disk, a ROM, or a CD-ROM, and a storage device such as a hard disk built into the computer system. As described above, the recording medium that stores the program may be a non-transitory recording medium such as a CD-ROM.

The recording medium also includes an internal or external recording medium accessible from a distribution server in order to distribute the program. The program may be divided into a plurality of programs, downloaded at different timings, and then combined with each configuration included in the information processing apparatus 10, or distribution servers for distributing the respective divided programs may be different. The "computer-readable recording medium" includes a medium that stores the program for a certain period of time, such as a volatile memory (RAM) inside a computer system that serves as a server or a client in a case where the program is transmitted via a network. The above program may be a program for realizing some of the above functions. The program may be a so-called difference file (difference program) in which the above functions can be realized in combination with a program already recorded in the computer system.

Some or all of the functions of the information processing apparatus 10 in the above-described embodiments may be realized by an integrated circuit such as a large scale integration (LSI). Each function may be individually realized as a processor, and some or all of the functions may be integrated into a processor. A method of forming an integrated circuit is not limited to the LSI, and may be realized by a dedicated circuit or a general-purpose processor. In a case where an integrated circuit technology that replaces an LSI will appear due to advances in semiconductor technology, an integrated circuit based on the technology may be used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 10 information processing apparatus
101 first chassis
102 second chassis
103 hinge mechanism
11 communication unit
12 RAM
13 storage unit
14 hall sensor
15 display unit
150 display
155 touch sensor
16 camera
161 first acceleration sensor
162 second acceleration sensor
17 speaker
18 microphone
19 control unit
191 usage form determination unit
192 keyboard connection detection unit
193 trigger detection unit
194 display mode control unit
1941 display mode switching portion
1942 switching specification control portion
What is claimed is:

1. An information processing apparatus comprising:
a foldable display;
a memory that temporarily stores display data to be displayed on the display; and
a processor that performs control when the display data stored in the memory is displayed on the display,
wherein the processor performs:
a display mode switching process of switching a plurality of display modes in a predetermined order, in a toggle manner, each time a user performs specific input, the plurality of display modes being determined according to a combination of screen region control for controlling to display a screen region of the display as one screen region or as a plurality of screen regions and a display direction control for controlling a display orientation on the screen region of the display,
a display mode restricting process of restricting display modes that are switchable in the display mode switching process among the plurality of display modes according to a usage form of the display, and
a display mode order change process of changing the predetermined order when the plurality of display modes are switched in the display mode switching process according to the usage form of the display,
wherein the usage form of the display is based on at least one or both of whether or not the display is in a bent state and an orientation of the display.

2. The information processing apparatus according to claim 1, wherein the plurality of display modes are determined according to, in addition to the screen region control and the display direction control, which screen region is set as a primary screen when the screen region is controlled to be displayed as the plurality of screen regions.

3. The information processing apparatus according to claim 1, wherein the processor further:

performs a history storage process of storing a history of a display mode selected by the user for each usage form of the display, and in the display mode restricting process, among the plurality of display modes, excludes a display mode selected infrequently by the user for each usage form of the display from the display modes that are switchable in the display mode switching process.

4. The information processing apparatus according to claim 1, wherein the specific input is operation input on a specific shortcut key of a keyboard connected to the information processing apparatus.

5. The information processing apparatus according to claim 4, wherein the processor controls to enable or disable the display mode switching process based on the operation input on the keyboard according to the usage form of the display.

6. The information processing apparatus according to claim 5, wherein the processor enables the display mode switching process based on the operation input on the keyboard in a case where the display is in a bent state, and disables the display mode switching process based on the operation input on the keyboard in a case where the display is not in the bent state.

7. The information processing apparatus according to claim 1, wherein the specific input is operation input on a touch pad included in a keyboard connected to the information processing apparatus.

8. The information processing apparatus according to claim 1, wherein the specific input is a specific touch operation on the display.

9. The information processing apparatus according to claim 8, wherein the processor controls to enable or disable the display mode switching process based on operation input on the display according to the usage form of the display.

10. The information processing apparatus according to claim 9, wherein the processor:

determines whether or not the information processing apparatus is in a state of being held by the user, and enables the display mode switching process based on the operation input on the display in a case where it is determined that the information processing apparatus is in a state of being held by the user, and disables the display mode switching process based on the operation input on the display in a case where it is determined that the information processing apparatus is not in the state of being held by the user.

11. The information processing apparatus according to claim 8, wherein in a case where a connection with a keyboard is detected, the processor disables the display mode switching process based on operation input on the display.

12. The information processing apparatus according to claim 1, wherein the specific input is a specific gesture, and the processor further:

performs a gesture image detection process of detecting a specific gesture image from a captured image that is captured by an imaging unit, and executes the display mode switching process each time the specific gesture image is detected in the gesture image detection process.

13. The information processing apparatus according to claim 1, wherein the specific input is input of a specific voice, the information processing apparatus further comprises a voice collecting unit that collects voices, and the processor further:

performs a voice detection process of detecting the specific voice from the voices collected by the voice collecting unit that collects the voices, and executes the display mode switching process each time the specific voice is detected in the voice detection process.

14. An information processing apparatus comprising:

a foldable display;

a memory that temporarily stores display data to be displayed on the display; and a processor that performs control when the display data stored in the memory is displayed on the display, wherein the processor performs:

a display mode switching process of switching a plurality of display modes in a predetermined order, in a toggle manner, each time a user performs specific input, the plurality of display modes being determined according to a combination of screen region control for controlling to display a screen region of the display as one screen region or as a plurality of screen regions and a display direction control for controlling a display orientation on the screen region of the display, and a display mode order change process of changing the predetermined order when the plurality of display modes are switched in the display mode switching process according to a usage form of the display, wherein the usage form of the display is based on at least one or both of whether or not the display is in a bent state and an orientation of the display.

15. The information processing apparatus according to claim 14, wherein the processor further:

performs a history storage process of storing a history of a display mode selected by the user for each usage form of the display, and in the display mode order change process, sets the predetermined order when the plurality of display modes are switched in the display mode switching process to an order in which a display mode selected frequently by the user for each usage form of the display among the plurality of display modes is prioritized.

16. A control method in an information processing apparatus including a foldable display, a memory that temporarily stores display data to be displayed on the display, and a processor that performs control when the display data stored in the memory is displayed on the display, the control method comprising:

causing the processor to execute:

a step of switching a plurality of display modes in a predetermined order, in a toggle manner, each time a user performs specific input, the plurality of display modes being determined according to a combination of screen region control for controlling to display a screen region of the display as one screen region or as a plurality of screen regions and a display direction control for controlling a display orientation on the screen region of the display, a step of restricting display modes that are switchable among the plurality of display modes according to a usage form of the display, and a step of changing the predetermined order when the plurality of display modes are switched according to the usage form of the display, wherein the usage form of the display is based on at least one or both of whether or not the display is in a bent state and an orientation of the display.

17. A control method in an information processing apparatus including a foldable display, a memory that temporarily stores display data to be displayed on the display, and a processor that performs control when the display data stored in the memory is displayed on the display, the control method comprising:

causing the processor to execute:

a step of switching a plurality of display modes in a predetermined order, in a toggle manner, each time a user performs specific input, the plurality of display modes being determined according to a combination of screen region control for controlling to display a screen region of the display as one screen region or as a plurality of screen regions and a display direction control for controlling a display orientation on the screen region of the display, and a step of changing the predetermined order when the plurality of display modes are switched according to a usage form of the display, wherein the usage form of the display is based on at least one or both of whether or not the display is in a bent state and an orientation of the display.

* * * * *